United States Patent
Shu

(10) Patent No.: US 11,394,169 B2
(45) Date of Patent: Jul. 19, 2022

(54) PULSED LASER WITH INTRACAVITY FREQUENCY CONVERSION AIDED BY EXTRA-CAVITY FREQUENCY CONVERSION

(71) Applicant: Coherent, Inc., Santa Clara, CA (US)

(72) Inventor: Qize Shu, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 49 days.

(21) Appl. No.: 16/994,431

(22) Filed: Aug. 14, 2020

(65) Prior Publication Data
US 2022/0052504 A1  Feb. 17, 2022

(51) Int. Cl.
| | | |
|---|---|---|
| G02F 1/37 | (2006.01) | |
| H01S 3/109 | (2006.01) | |
| G02F 1/35 | (2006.01) | |
| H01S 3/00 | (2006.01) | |
| H01S 3/11 | (2006.01) | |
| H01S 3/108 | (2006.01) | |

(52) U.S. Cl.
CPC .......... *H01S 3/109* (2013.01); *G02F 1/3501* (2013.01); *G02F 1/3534* (2013.01); *G02F 1/37* (2013.01); *H01S 3/0071* (2013.01); *H01S 3/0092* (2013.01); *H01S 3/1103* (2013.01); *G02F 1/3507* (2021.01); *H01S 3/108* (2013.01)

(58) Field of Classification Search
CPC .... G02F 1/3501; G02F 1/3507; G02F 1/3534; G02F 1/37; H01S 3/0071; H01S 3/0092; H01S 3/109; H01S 3/1103
See application file for complete search history.

(56) References Cited

U.S. PATENT DOCUMENTS

| | | | |
|---|---|---|---|
| 5,721,748 A * | 2/1998 | Injeyan | ..................... H01S 3/30 372/20 |
| 6,002,695 A | 12/1999 | Alfrey et al. | |
| 6,249,371 B1 | 6/2001 | Hisashi et al. | |
| 6,327,281 B1 * | 12/2001 | Yin | ........................ H01S 3/109 372/21 |
| 6,999,483 B1 | 2/2006 | Yin | |
| 7,016,389 B2 | 3/2006 | Dudley et al. | |
| 9,568,803 B2 | 2/2017 | Morehead et al. | |

(Continued)

OTHER PUBLICATIONS

International Search Report and Written Opinion received for International Patent Application No. PCT/US2021/044530 dated Nov. 29, 2021, 14 pages.

*Primary Examiner* — Daniel Petkovsek
(74) *Attorney, Agent, or Firm* — Morrison & Foerster LLP

(57) ABSTRACT

A pulsed third-harmonic laser system includes a pulsed laser, an extra-cavity nonlinear crystal, and an intracavity nonlinear crystal. The pulsed laser generates fundamental laser pulses and couples out a portion of each fundamental laser pulse out of the laser resonator to undergo second-harmonic-generation in the extra-cavity nonlinear crystal. Resulting second-harmonic laser pulses are directed back into the laser resonator and mixes with the fundamental laser pulses in the intracavity nonlinear crystal to generate third-harmonic laser pulses. The pulsed third-harmonic laser system thus maintains a non-zero output coupling efficiency regardless of the efficiency of the second-harmonic-generation stage, while the third-harmonic-generation stage benefits from the intracavity power of the fundamental laser pulses.

30 Claims, 11 Drawing Sheets

(56) References Cited

U.S. PATENT DOCUMENTS

| | | | |
|---|---|---|---|
| 9,709,789 B2* | 7/2017 | Dam | G02B 21/361 |
| 2012/0057608 A1* | 3/2012 | Seelert | H01S 5/14 |
| | | | 372/10 |
| 2020/0132906 A1 | 4/2020 | Caprara | |

* cited by examiner

PULSED LASER WITH INTRACAVITY FREQUENCY CONVERSION AIDED BY EXTRA-CAVITY FREQUENCY CONVERSION

TECHNICAL FIELD OF THE INVENTION

The present invention relates in general to frequency conversion of pulsed laser radiation, in particular frequency conversion of pulsed laser radiation of high optical power.

DISCUSSION OF BACKGROUND ART

Lasers rely on amplified stimulated emission in a gain medium inside a laser resonator. A wide variety of different gain media, e.g., gas, solid-state crystals, semiconductors, and liquid dyes, have been employed to generate laser radiation of different wavelengths and characterized by range of powers, temporal properties, and other properties. Laser radiation may be generated as continuous-wave radiation or pulsed radiation. Pulsed laser radiation may be generated by several different techniques, including mode-locking of different modes propagating in the laser resonator to form short pulses through constructive interference, Q-switching that modulates the loss of the resonator to alternatingly build up energy in the gain medium and extract the accumulated energy as a pulse, and cavity-dumping wherein an optical modulator controls energy build-up and pulse extraction.

Some existing pulsed lasers are capable of generating a train of short laser pulses of high power, such as nanosecond pulses with a peak power in the kilowatt or megawatt range. It is, however, generally not possible to achieve the desired power and/or temporal characteristics at any arbitrary wavelength, and frequency-conversion is commonly used to modify the frequency of the laser radiation to reach a desired wavelength. For example, third-harmonic-generation (THG) has been used to convert near-infrared pulsed laser radiation from a diode-pumped solid-state laser to ultraviolet pulsed laser radiation. This THG approach benefits from desirable properties of the diode-pumped solid-state laser, such as high power and reliable operation.

Most commonly, THG is achieved in two stages: second-harmonic generation (SHG) in one nonlinear crystal followed by mixing of a remaining portion of the fundamental laser radiation and the second-harmonic laser radiation in a second nonlinear crystal to form the third-harmonic radiation through the mechanism of sum-frequency-mixing (SFM). In a relatively simple THG approach, this two-stage frequency-conversion takes place outside the laser resonator, using two nonlinear crystals placed in the path of the laser radiation coupled out from the laser resonator. It may, however, be advantageous to place the nonlinear crystals inside the laser resonator so as to benefit from the higher intracavity power of the fundamental laser radiation. With the higher intracavity fundamental power, higher-power third-harmonic radiation may be generated and/or the efficiency requirements of the frequency conversions may be relaxed to achieve other benefits such as a more stable output.

To optimize two-stage, intracavity THG, the laser resonator is effectively loss-less apart from the mechanism of frequency conversion, and the THG conversion efficiency is balanced against the optimal output coupling efficiency of the laser resonator. For example, with a laser resonator having an optimum output coupling efficiency of 50%, 50% of the intracavity fundamental radiation is ideally frequency converted. Furthermore, ideally, all second-harmonic radiation generated in the SHG stage is converted to third-harmonic radiation in the SFM stage, such that the overall conversion efficiency of fundamental radiation to the third harmonic is 50%. In this ideal scenario, energy conservation imposes that the optimum conversion efficiencies of the fundamental radiation in the individual SHG and SFM stages are $2/3$ and $1/3$, respectively, of the optimum output coupling efficiency. With an optimum output coupling efficiency of 50%, the resulting optimum conversion efficiencies for SHG and SFM are 33% and 17%, respectively.

SUMMARY OF THE INVENTION

We have realized that two-stage, intracavity third-harmonic-generation (THG) of pulsed laser radiation is associated with certain issues, particularly when operating in a high-power regime such as with an average power in the kilowatt range or a peak power in the megawatt range. Of significant concern is the fact that there is a risk of damaging optical elements. This risk stems from pulse-to-pulse variability of the second-harmonic-generation (SHG) and sum-frequency-mixing (SFM) conversion efficiencies. When either one of the SHG and SFM conversion efficiency is lower than usual, the intracavity fundamental power is higher than usual. If either one of the SHG and SFM conversion efficiencies drops significantly below its intended design value, the intracavity fundamental power may exceed the damage threshold for one or more optical elements of the otherwise loss-less laser resonator. More importantly, in the case of Q-switched high-power lasers, low cavity loss of the fully reflective resonator required for optimum intracavity THG causes difficulties maintaining Q-switch hold-off.

The present invention overcomes these issues by moving the first frequency-conversion stage outside the resonator and performing only the second frequency-conversion stage inside the laser resonator. Fundamental-frequency laser radiation is coupled out of the laser resonator to undergo an extra-cavity frequency-conversion stage. Frequency-converted laser radiation generated hereby is then directed back into the laser resonator to mix with the intracavity fundamental laser radiation in an intracavity frequency conversion stage. In this scheme, the laser resonator is configured to couple out a portion of the fundamental laser power, thus eliminating the issues caused by a laser resonator whose only loss mechanism is frequency conversion. The present invention may be applied to two-stage THG, as well as to other two-stage frequency conversion processes. In the case of THG, extra-cavity SHG is followed by intracavity SFM, such that the SFM benefits from the high-power intracavity fundamental radiation.

In one aspect, pulsed laser system includes a pulsed laser, an extra-cavity nonlinear crystal, and an intracavity nonlinear crystal. The pulsed laser is configured to generate fundamental laser pulses in a laser resonator. The laser resonator includes an output coupler for outputting a portion of each fundamental laser pulse. The extra-cavity nonlinear crystal is external to the laser resonator and is configured to frequency-double at least a fraction of each fundamental laser pulse received from the output coupler so as to generate second-harmonic laser pulses. The intracavity nonlinear crystal is located in the laser resonator and is configured to generate third-harmonic laser pulses from sum-frequency mixing of (a) the fundamental laser pulses as propagating in the laser resonator and (b) the second-harmonic laser pulses as received from the extra-cavity nonlinear crystal.

In another aspect, a method for generating third-harmonic pulsed laser radiation, includes (a) generating fundamental laser pulses in a laser resonator, (b) coupling a portion of each fundamental laser pulse out of the laser resonator, (c) outside the laser resonator, frequency doubling at least a fraction of each fundamental laser pulse to generate second-harmonic laser pulses, (d) directing the second-harmonic laser pulses into the laser resonator, and (e) inside the laser resonator, generating third-harmonic laser pulses from sum-frequency mixing the second-harmonic laser pulses with the fundamental laser pulses propagating in the laser resonator.

In yet another aspect, a pulsed laser system with intracavity frequency conversion aided by extra-cavity frequency conversion includes a pulsed laser, one or more extra-cavity nonlinear crystals, and an intracavity nonlinear crystal. The pulsed laser is configured to generate fundamental laser pulses in a laser resonator. The laser resonator includes an output coupler for outputting a portion of each fundamental laser pulse. The one or more extra-cavity nonlinear crystals are external to the laser resonator and are configured to frequency convert at least a portion of each fundamental laser pulse received from the output coupler so as to generate first frequency-converted laser pulses. The intracavity nonlinear crystal is located in the laser resonator and is configured to generate second frequency-converted laser pulses from mixing of (a) the fundamental laser pulses as propagating in the laser resonator and (b) the first frequency-converted laser pulses as received from the extra-cavity nonlinear crystals.

In a further aspect, a method for frequency conversion of pulsed laser radiation includes (a) generating fundamental laser pulses in a laser resonator, (b) coupling a portion of each fundamental laser pulse out of the laser resonator, (c) outside the laser resonator, converting frequency of at least a fraction of each fundamental laser pulse to generate first frequency-converted laser pulses, (d) directing the first frequency-converted laser pulses into the laser resonator, and (e) inside the laser resonator, generating second frequency-converted laser pulses by mixing the first frequency-converted laser pulses with the fundamental laser pulses.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE INVENTION

Figure 1:
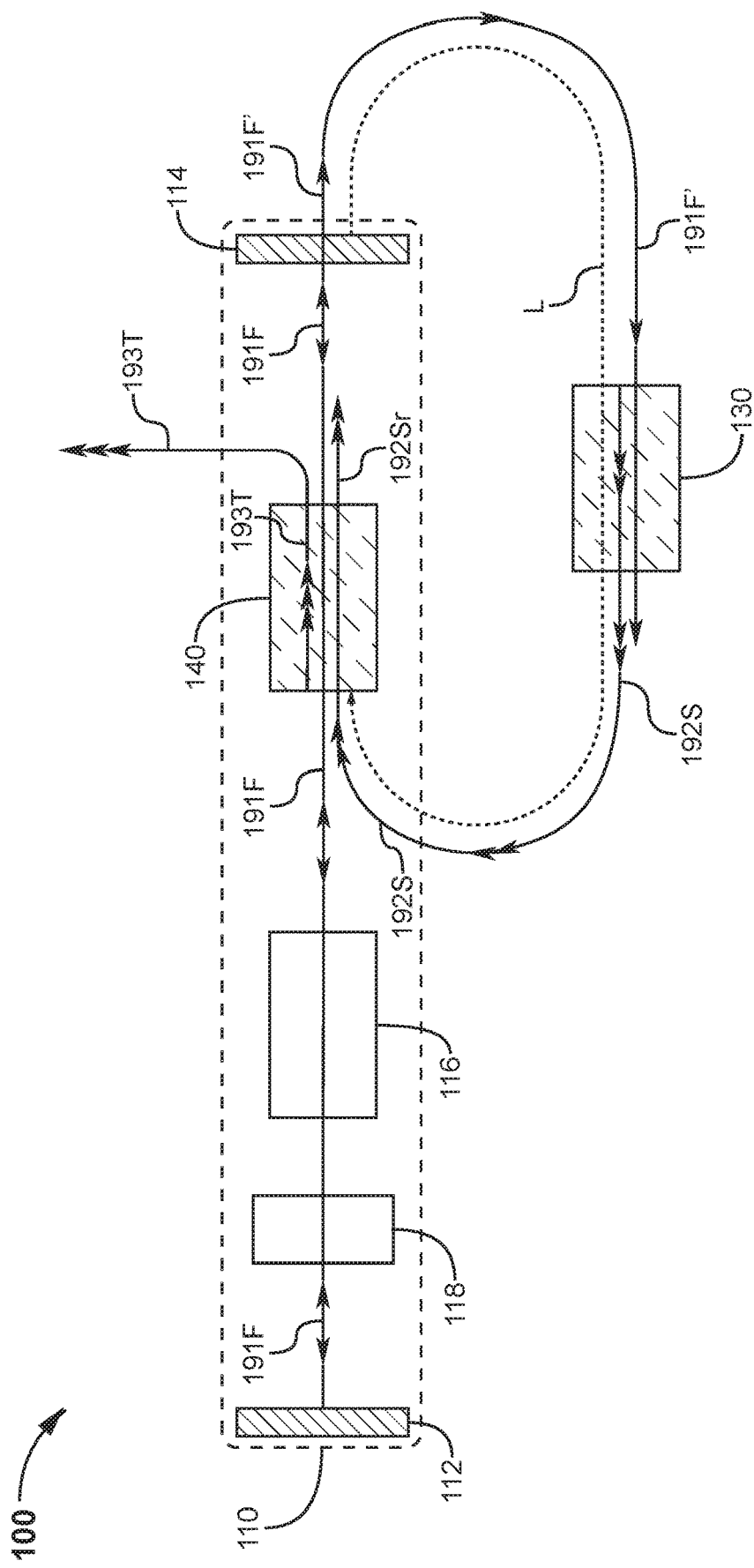
FIG. 1 illustrates a pulsed THG laser system with intracavity third-harmonic-generation (THG) based on extra-cavity second-harmonic-generation (SHG), according to an embodiment.

Referring now to the drawings, wherein like components are designated by like numerals, FIG. 1 illustrates one pulsed THG laser system 100 with intracavity third-harmonic-generation (THG) based on extra-cavity second-harmonic-generation (SHG). Pulsed THG laser system 100 includes a pulsed laser 110 configured to generate pulsed laser radiation in the form of fundamental-frequency laser pulses 191F. Pulsed THG laser system 100 further includes an extra-cavity nonlinear crystal 130 located outside the laser resonator of pulsed laser 110, and an intracavity nonlinear crystal 140 located inside the laser resonator of pulsed laser 110 in the propagation path of fundamental laser pulses 191F. Pulsed laser 110 includes a laser resonator with an output coupler 114.

In the example depicted in FIG. 1, the laser resonator of pulsed laser 110 is a linear resonator formed by an output coupler 114 and a mirror 112. Without departing from the scope hereof, pulsed laser 110 may include additional reflectors to form a linear resonator with a folded geometry, or a ring resonator. Output coupler 114 has a non-zero output coupling efficiency. Output coupler 114 may be an output coupling mirror with a fixed transmission coefficient. Alternatively, the transmission coefficient of output coupler 114 may be adjustable. For example, output coupler 114 may include an adjustable waveplate and a polarizing beamsplitter. Mirror 112 is a high-reflector and may have a reflectivity of at least 99% in the wavelength range of fundamental laser pulses 191F. Mirror 112 may be replaced by another form of reflector having a similar reflectivity.

In operation, pulsed laser 110 couples a portion of each fundamental laser pulse 191F out of the laser resonator via output coupler 114, such that pulsed laser 110 outputs a beam of fundamental laser pulses 191F'. Fundamental laser pulses 191F' are directed to extra-cavity nonlinear crystal 130 for SHG. Extra-cavity nonlinear crystal 130 frequency-doubles at least a fraction of each fundamental laser pulse 191F' to generate a beam of second-harmonic laser pulses 192S. Second-harmonic laser pulses 192S enter the laser resonator of pulsed laser 110 to mix with the fundamental laser pulses 191F in intracavity nonlinear crystal 140. Intracavity nonlinear crystal 140 generates third-harmonic laser pulses 193T via sum-frequency-mixing (SFM) of fundamental laser pulses 191F and second-harmonic laser pulses 192S. Residual power (if any) of second-harmonic laser pulses 192S emerge from intracavity nonlinear crystal 140 as residual second-harmonic laser pulses 192Sr.

The non-zero output coupling efficiency of output coupler 114 helps prevent damage to intracavity optical elements. As discussed above, this is a significant advantage over pure intracavity THG when operating in a high-power regime, for example with an average power in the kilowatt range or a peak power in the megawatt range. (Herein, the average power of a train of laser pulses refers to the rate of energy flow averaged over one full period.) The value of the output coupling efficiency of output coupler 114 determines the power of fundamental laser pulses 191F' available for SHG in extra-cavity nonlinear crystal 130, and thus at least partly determines the power of second-harmonic laser pulses 192S available for SFM in intracavity nonlinear crystal 140. A higher output coupling efficiency results in higher power of second-harmonic laser pulses 192S. However, a higher output coupling efficiency also reduces the power of fundamental laser pulses 191F available for SFM in intracavity nonlinear crystal 140. Thus, the output coupling efficiency of output coupler 114 may be set to optimize the relative powers of fundamental laser pulses 191F and second-harmonic laser pulses 192S for optimal overall SFM in intracavity nonlinear crystal 140. Such optimization may further take into account a requirement that the output coupling efficiency should be sufficiently high to keep the power of fundamental laser pulses 191F within a safe operating range that prevents damage to intracavity optical elements even if the SFM conversion efficiency becomes low or zero. A trade-off may exist between maximizing the power of third-harmonic laser pulses 193T and preventing damage. In one embodiment, the output coupling efficiency of output coupler 114 is in the range between 20% and 50%, to maximize the power of third-harmonic laser pulses 193T while preventing damage in case of low or zero SFM conversion in intracavity nonlinear crystal 140.

While the damage risk in the pure intracavity THG scheme could conceivably be mitigated by operating with non-zero out-coupling of the fundamental laser radiation, we have found that the present scheme with extra-cavity SHG to be superior when damage prevention is a high priority. For example, consider a scenario where safe operation of the laser resonator in the pure intracavity THG scheme requires a guaranteed loss 30% of each fundamental laser pulse, and the pulse-to-pulse conversion efficiency variation is such that only 10% conversion efficiency of the fundamental laser radiation can be reasonably guaranteed for every pulse over the intended lifespan of the laser system. In this scenario, damage mitigation could be in the form of coupling out 20% of each fundamental laser pulse. Those 20% would, however, not contribute to frequency conversion. In contrast, the extra-cavity SHG of the present scheme recaptures the out-coupled portion of each fundamental laser pulse. Pulsed THG laser system 100 is therefore capable of more efficiently converting the fundamental laser radiation to the third harmonic than the pure intracavity THG scheme damage-mitigated by a 20% output coupler.

The present use of extra-cavity SHG has additional advantages over the pure intracavity THG scheme. One advantage is a reduced interaction between lasing and frequency conversion, with only one of the two stages of frequency conversion taking place inside the laser resonator, resulting in a less variable THG. The extra-cavity propagation path of second-harmonic laser pulses 192S further makes it possible to adjust the transverse mode of second-harmonic laser pulses 192S outside the laser resonator of pulsed laser 110 without affecting the beam shape of fundamental laser pulses 191F. Such extra-cavity beam-shaping may improve the overlap between fundamental laser pulses 191F and second-harmonic laser pulses 192S in intracavity nonlinear crystal 140. Furthermore, pulsed THG laser system 100 makes it possible to direct second-harmonic laser pulses 192S through intracavity nonlinear crystal 140 at a non-zero angle with respect to the propagation path of fundamental laser pulses 191F, such that third-harmonic laser pulses 193T may be extracted from the laser resonator of pulsed laser 110 without placing a dichroic mirror in the beam path of fundamental laser pulses 191F.

In the linear-resonator example depicted in FIG. 1, intracavity nonlinear crystal 140 is located between the laser gain medium 116 of pulsed laser 110 and output coupler 114, and pulsed THG laser system 100 directs second-harmonic laser pulses 192S to enter intracavity nonlinear crystal 140 from the laser-gain-medium side of intracavity nonlinear crystal 140. In this example, phase matching between fundamental laser pulses 191F, second-harmonic laser pulses 192S, and third-harmonic laser pulses 193T is achieved for fundamental laser pulses 191F propagating in the direction from laser gain medium 116 toward output coupler 114. As a result, SFM in intracavity nonlinear crystal 140 advantageously benefits from the higher power of fundamental laser pulses 191F prior to coupling out a portion of this power via output coupler 114. Without departing from the scope hereof, laser gain medium 116 may instead be located between intracavity nonlinear crystal 140 and output coupler 114, for example to achieve other benefits such as those discussed below in reference to FIG. 6.

In certain embodiments, pulsed laser 110 generates near-infrared fundamental laser pulses 190, such that second-harmonic laser pulses 192S are in the visible spectrum, and third-harmonic laser pulses 193T are ultraviolet. In one example of this embodiment, pulsed laser 110 is a solid-state laser. Laser gain medium 116 of pulsed laser 110 may be a diode-pumped, rare-earth doped yttrium aluminum garnet (YAG) crystal, for example a neodymium-doped YAG crystal generating fundamental laser pulses 191F with a wavelength of 1064 nanometer (nm), or a ytterbium-doped YAG crystal generating fundamental laser pulses 191F with a wavelength of 1030 nm. One or both of extra-cavity nonlinear crystal 130 and intracavity nonlinear crystal 140 may be a lithium triborate crystal. The length of the lithium triborate crystal is, for example, between 1 and 10 millimeters.

Pulsed laser 110 is, for example, a nanosecond laser or an ultrafast laser. In the embodiment of pulsed THG laser system 100 where pulsed laser 110 is a nanosecond laser, hereinafter referred to as the nanosecond embodiment, the pulse width of fundamental laser pulses 191F may be between one nanosecond and one microsecond, and the average power before output coupling may be at least 500 watts, for example in the range between 1 and 10 kilowatts. In the nanosecond embodiment, pulsed laser 110 may further include a Q-switch 118 that forces lasing in the laser resonator of pulsed laser 110 to be pulsed. As discussed above, the present scheme with extra-cavity SHG overcomes the challenges in the pure intracavity THG scheme of maintaining Q-switch hold-off.

In the embodiment of pulsed THG laser system 100 where pulsed laser 110 is an ultrafast laser, hereinafter referred to as the ultrafast embodiment, the pulse width of fundamental laser pulses 191F is less than one nanosecond. In the ultrafast embodiment, pulsed laser 110 may be a picosecond laser generating fundamental laser pulses 191F with a pulse width between one picosecond and one nanosecond, or pulsed laser 110 may be a femtosecond laser generating fundamental laser pulses 191F with a pulse width that is less than one picosecond. The picosecond and femtosecond lasers may generate the train of fundamental laser pulses 191F with an average power in the range between a milliwatt and hundreds of watts.

In both the nanosecond and the ultrafast embodiment, laser gain medium 116 may be a rare-earth doped YAG crystal or another crystal that lases in the near-infrared spectrum such that third-harmonic laser pulses 193T are ultraviolet.

In either one of the nanosecond and ultrafast embodiments, pulsed laser 110 may utilize cavity-dumping. In such implementations, output coupler 114 is an optical modulator, and the reflectors defining the laser resonator of pulsed laser 110 (e.g., mirror 112) are high-reflectors. In conventional cavity-dumping, the optical modulator cycles through (a) coupling out most light to prevent lasing and store energy in the laser gain medium, (b) rapidly switching to prevent coupling out of light such that the laser resonator experiences only small parasitic losses and the intracavity power builds quickly, and (c) rapidly switching to again couple out most of the light so as to first output a pulse of laser radiation and then return to storing energy in the laser gain medium. In contrast, in the present implementations, the modulator would maintain a non-negligible level of output coupling even in the phase where the intracavity power builds up, so as to prevent damage to intracavity optical elements and provide fundamental laser pulses 191F' for extra-cavity SHG. In cavity-dumped implementations of the nanosecond embodiment, the optical modulator may be an acousto-optic modulator. In cavity-dumped implementations of the ultrafast embodiment, the optical modulator may be an electro-optic modulator.

Figure 2:
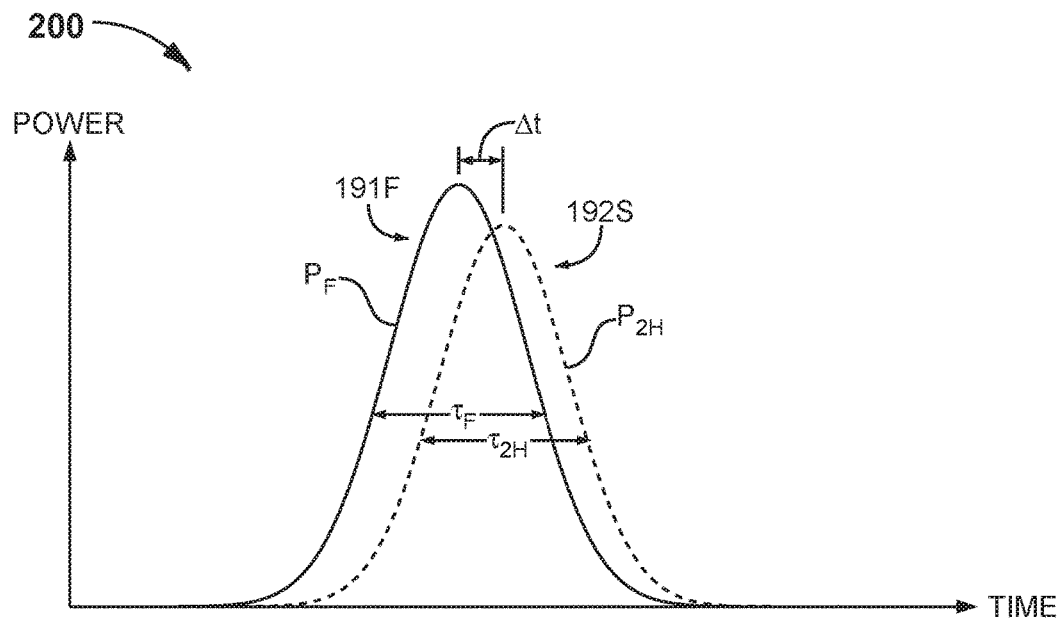
FIG. 2 illustrates an example of pulse synchronization in the pulsed THG laser system of FIG. 1.

FIG. 2 is a diagram 200 that illustrates one example of pulse synchronization in pulsed THG laser system 100. Diagram 200 plots, as a function of time, the power $P_F$ of one fundamental laser pulse 191F together with the power $P_{2H}$ of a second-harmonic laser pulse 192S generated therefrom. Diagram 200 plots both $P_F$ and $P_{2H}$ at the location of intracavity nonlinear crystal 140. Fundamental laser pulses 191F and second-harmonic laser pulses 192S have respective average pulse widths $\tau_F$ and $\tau_{2H}$ (defined as full width at half maximum). Due to the nonlinear nature of SHG in extra-cavity nonlinear crystal 130, $\tau_{2H}$ is typically less than $\tau_F$. The pulse shapes may differ from the those depicted in FIG. 2. The combined path length L (see FIG. 1) from output coupler 114 via extra-cavity nonlinear crystal 130 to intracavity nonlinear crystal 140 causes a delay Δt, at intracavity nonlinear crystal 140, between any one fundamental laser pulse 191F and the corresponding second-harmonic laser pulse 192S generated therefrom.

In the example depicted in diagram 200, delay Δt is small relative to $\tau_F$. Therefore, each second-harmonic laser pulse 192S temporally overlaps, at intracavity nonlinear crystal 140, with the fundamental laser pulse 191F from which it originated. This scenario may apply to the nanosecond embodiment of pulsed THG laser system 100. In one example, path length L is 1 meter and thus causes a delay Δt of approximately 3 nanoseconds, such that any one fundamental laser pulse 191F and the corresponding second-harmonic laser pulse 192S generated therefrom will have good temporal overlap at intracavity nonlinear crystal 140 for pulse widths $\tau_F$ of about 30-100 nanoseconds or greater. In another example, path length L is 0.1 meter and thus causes a delay Δt of approximately 0.3 nanoseconds, such that any one fundamental laser pulse 191F and the corresponding second-harmonic laser pulse 192S generated therefrom will have good temporal overlap at intracavity nonlinear crystal 140 for pulse widths $\tau_F$ as small as about 3-10 nanoseconds or greater. Thus, in one embodiment, pulsed THG laser system 100 is configured with a path length L that is less than $0.1c\tau_F$ (wherein c is the speed of light), so as to ensure a good temporal overlap between fundamental laser pulses 191F and second-harmonic laser pulses 192S for effective SFM in intracavity nonlinear crystal 140.

Figure 3:
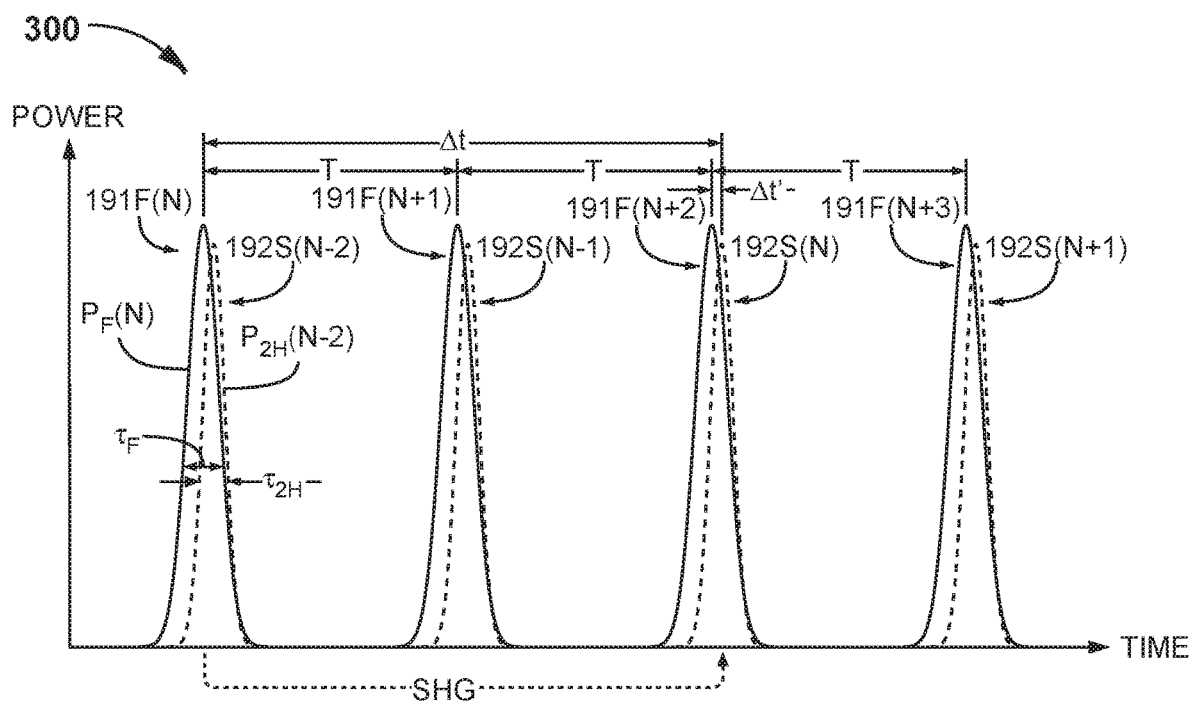
FIG. 3 illustrates another example of pulse synchronization in the pulsed THG laser system of FIG. 1.

FIG. 3 is a diagram 300 that illustrates another example of pulse synchronization in pulsed THG laser system 100. Diagram 300 plots, as a function of time, the power $P_F$ of a series of fundamental laser pulses 191F together with the power $P_{2H}$ of a series of second-harmonic laser pulse 192S generated therefrom. Diagram 300 plots both $P_F$ and $P_{2H}$ at the location of intracavity nonlinear crystal 140. As in the example of FIG. 2, fundamental laser pulses 191F and second-harmonic laser pulses 192S have respective average pulse widths $\tau_F$ and $\tau_{2H}$, and the pulse shapes may differ from the those depicted. The repetition rate $f_{rep}$ of pulsed laser 110 corresponds to a period T between fundamental laser pulses 191F.

In the example depicted in FIG. 3, the path-length-induced delay Δt between fundamental laser pulse 191F and second-harmonic laser pulses 192S is much greater than $\tau_F$. Consequently, no second-harmonic laser pulse 192S can temporally overlap, at intracavity nonlinear crystal 140, with the fundamental laser pulse 191F from which it originated. Instead, pulsed THG laser system 100 is configured with a path length L that synchronizes each second-harmonic laser pulse 192S with a fundamental laser pulse 191F that is subsequent to the fundamental laser pulse 191F from which the second-harmonic laser pulse 192S originated. For example, as shown in FIG. 3, path length L may be set such that delay Δt is approximately twice the period T.

In one scenario, path length L deviates by less than $0.1c\tau_F$ from an integer multiple M of $T=c/f_{rep}$ (wherein M is greater than zero), so as to ensure a good temporal overlap between fundamental laser pulses 191F and second-harmonic laser pulses 192S for effective SFM in intracavity nonlinear crystal 140. This scenario may apply to the ultrafast embodiment of pulsed THG laser system 100, where it may be impractical to arrange a path length L short enough to achieve a delay Δt that is small relative to $\tau_F$.

Figure 4:
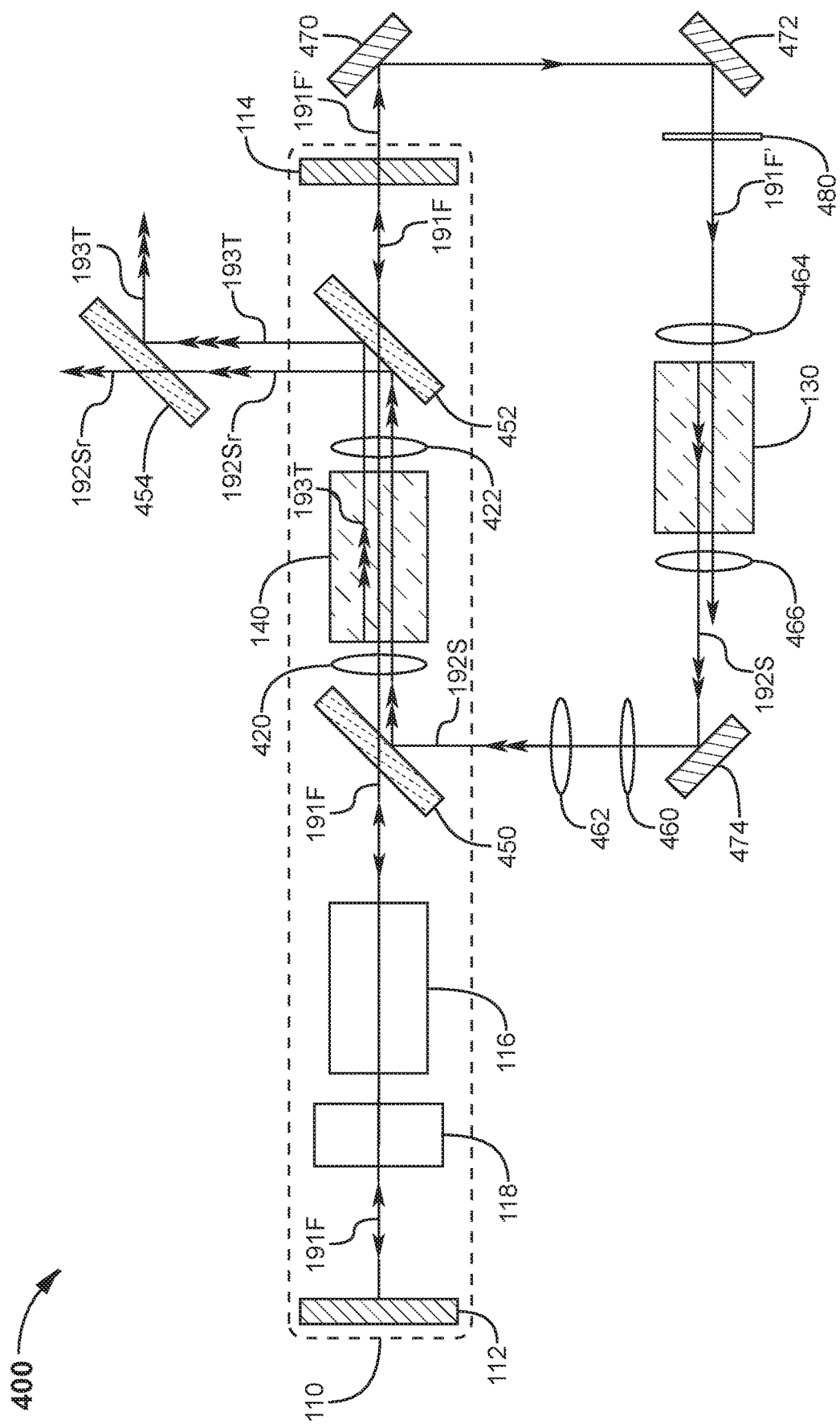
FIG. 4 illustrates a pulsed THG laser system with intracavity THG based on extra-cavity SHG and configured with collinear propagation of fundamental-frequency laser pulses and second-harmonic laser pulses in an intracavity nonlinear crystal, according to an embodiment.

FIG. 4 illustrates one pulsed THG laser system 400 with collinear propagation of fundamental laser pulses 191F and second-harmonic laser pulses 192S in intracavity nonlinear crystal 140. Pulsed THG laser system 400 is an embodiment of pulsed THG laser system 100 that includes intracavity dichroic mirrors 450 and 452 located in the laser resonator of pulsed laser 110 on opposite sides of intracavity nonlinear crystal 140. Intracavity dichroic mirror 450 receives second-harmonic laser pulses 192S from extra-cavity nonlinear crystal 130 and merges second-harmonic laser pulses 192S with fundamental laser pulses 191F, such that fundamental laser pulses 191F and second-harmonic laser pulses 192S collinearly co-propagate through intracavity nonlinear crystal 140. Intracavity dichroic mirror 452 splits residual second-harmonic laser pulses 192Sr and third-harmonic laser pulses 193T from fundamental laser pulses 191F and directs residual second-harmonic laser pulses 192Sr and third-harmonic laser pulses 193T out of the laser resonator.

In the configuration depicted in FIG. 4, intracavity dichroic mirror 450 is located between laser gain medium 116 and intracavity nonlinear crystal 140, and intracavity dichroic mirror 452 is located between intracavity nonlinear crystal 140 and output coupler 114. Therefore, phase matching between fundamental laser pulses 191F, second-harmonic laser pulses 192S, and third-harmonic laser pulses 193T is achieved for the higher-power fundamental laser pulses 191F propagating in the direction from laser gain medium 116 toward output coupler 114, as discussed above in reference to FIG. 1. In an alternative embodiment, the positions of intracavity dichroic mirrors are swapped relative to the configuration depicted in FIG. 4.

Pulsed THG laser system 400 further includes an extra-cavity dichroic mirror 454 that splits third-harmonic laser pulses 193T from residual second-harmonic laser pulses 192Sr outside the laser resonator. Although FIG. 4 shows extra-cavity dichroic mirror 454 as being reflective to third-harmonic laser pulses 193T and transmissive to residual second-harmonic laser pulses 192Sr, extra-cavity dichroic mirror 454 may instead be transmissive to third-harmonic laser pulses 193T and reflective to residual second-harmonic laser pulses 192Sr.

Pulsed THG laser system 400 further includes a plurality of beam-steering elements that define the propagation path of fundamental laser pulses 191F' and second-harmonic laser pulses 192S between output coupler 114 and intracavity dichroic mirror 450. For example, as shown in FIG. 4, two extra-cavity mirrors 470 and 472 direct fundamental laser pulses 191F' from output coupler 114 to extra-cavity nonlinear crystal 130, and an extra-cavity mirror 474 directs second-harmonic laser pulses 192S from extra-cavity nonlinear crystal 130 to intracavity dichroic mirror 450. Extra-cavity mirror 474 may be a dichroic mirror that splits second-harmonic laser pulses 192S from any residual power of fundamental laser pulses 191F'. Alternatively, such residual power of fundamental laser pulses 191F' is allowed to co-propagate with second-harmonic laser pulses 192S to intracavity dichroic mirror 450.

Without departing from the scope hereof, extra-cavity nonlinear crystal 130 may be placed in a different location on the path between output coupler 114 and intracavity dichroic mirror 450, for example directly after output coupler 114 before the first extra-cavity mirror. Also without departing from the scope hereof, pulsed THG laser system 400 may include a different number of extra-cavity mirrors and/or implement other deflection angles than shown in FIG. 4.

In one embodiment, pulsed THG laser system 400 focuses the light entering one or both of extra-cavity nonlinear crystal 130 and intracavity nonlinear crystal 140 for more efficient frequency-conversion. For example, as shown in FIG. 4, pulsed THG laser system 400 may include lenses 420 and 422 located on opposite sides of intracavity nonlinear crystal 140, and lenses 464 and 466 located on opposite sides of extra-cavity nonlinear crystal 130. Lens 420 focuses fundamental laser pulses 191F and second-harmonic laser pulses 192S into intracavity nonlinear crystal 140, and lens 422 at least approximately collimates fundamental laser pulses 191F, residual second-harmonic laser pulses 192Sr, and third-harmonic laser pulses 193T on the output-side of intracavity nonlinear crystal 140. Similarly, lens 464 focuses fundamental laser pulses 191F' into extra-cavity nonlinear crystal 130, and lens 466 at least approximately collimates second-harmonic laser pulses 192S (and, optionally, also any residual power of fundamental laser pulses 191F') on the output-side extra-cavity nonlinear crystal 130. Focusing of light into the nonlinear crystals may be particularly advantageous in a nanosecond embodiment of pulsed THG laser system 400, whereas focusing may not be needed in an ultrafast embodiment of pulsed THG laser system 400, where the peak powers of the laser pulses is generally much higher.

In one implementation, the power and position of lenses 464, relative to lens 466, are set to achieve a desired beam size of second-harmonic laser pulses 192S for optimal spatial overlap with fundamental laser pulses 191F in intracavity nonlinear crystal 140. In another implementation, pertaining for example to embodiments of pulsed THG laser system 400 that do not include lenses 464 and 466, one or more dedicated beam-shaping elements are located in the path of second-harmonic laser pulses 192S between extra-cavity nonlinear crystal 130 and intracavity dichroic mirror 450. FIG. 4 shows one such implementation, where a pair of lenses 460 and 462 form a telescope configured to optimize the beam size of second-harmonic laser pulses 192S at intracavity nonlinear crystal 140. The beam-shaping of second-harmonic laser pulses 192S, in either of these two implementations, may be performed without affecting the beam-shaping of fundamental laser pulses 191F.

Pulsed THG laser system 400 may be configured for type I phase matching in each of extra-cavity nonlinear crystal 130 and intracavity nonlinear crystal 140, in which case pulsed THG laser system 400 may include a half-wave plate 480 either (i) in the path of fundamental laser pulses 191F' before extra-cavity nonlinear crystal 130 (as shown in FIG. 4), or (ii) in the path of second-harmonic laser pulses 192S between extra-cavity nonlinear crystal 130 and intracavity dichroic mirror 450.

In the example depicted in FIG. 4, the laser resonator of pulsed laser 110 is a linear resonator formed by output coupler 114 and a mirror 112. As discussed above in reference to FIG. 1, pulsed laser 110 may include additional reflectors to form a linear resonator with a folded geometry, or a ring resonator. A nanosecond embodiment of pulsed THG laser system 400 may include Q-switch 118. Pulsed THG laser system 400 may implement cavity-dumping, as discussed above in reference to FIG. 1.

Figure 5:
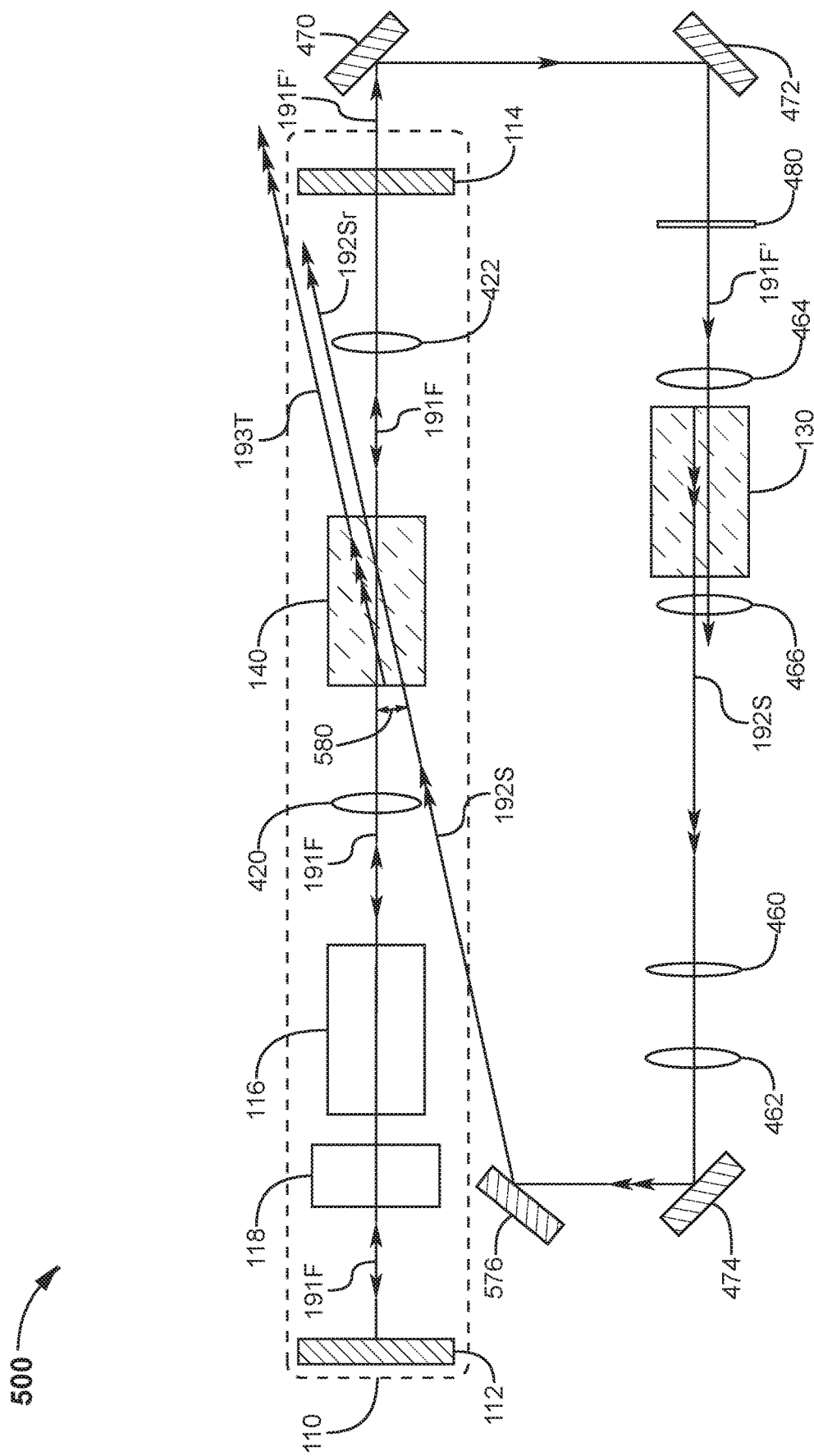
FIG. 5 illustrates a pulsed THG laser system with intracavity THG based on extra-cavity SHG and configured with non-collinear propagation of fundamental-frequency laser pulses and second-harmonic laser pulses in an intracavity nonlinear crystal, according to an embodiment.

FIG. 5 illustrates one pulsed THG laser system 500 with non-collinear propagation of fundamental laser pulses 191F and second-harmonic laser pulses 192S in intracavity nonlinear crystal 140. Pulsed THG laser system 500 is an embodiment of pulsed THG laser system 100 and a modification of pulsed THG laser system 400. Pulsed THG laser system 500 does not includes intracavity dichroic mirrors 450 and 452. Instead, pulsed THG laser system 500 is configured to direct second-harmonic laser pulses 192S through intracavity nonlinear crystal 140 at a non-zero angle 580 with respect to the propagation direction of fundamental laser pulses 191F. In some scenarios, elimination of intracavity dichroic mirrors 450 and 452 may be preferred over the collinear propagation configuration of pulsed THG laser system 400. In other scenarios, the better spatial overlap between fundamental laser pulses 191F and second-harmonic laser pulses 192S in intracavity nonlinear crystal 140 of pulsed THG laser system 400 may be preferred or needed to achieve a desired SFM efficiency in intracavity nonlinear crystal 140.

Pulsed THG laser system 500 includes an extra-cavity mirror 576 that directs second-harmonic laser pulses 192S into intracavity nonlinear crystal 140 at angle 580 to fundamental laser pulses 191F. Extra-cavity mirror 576 is arranged such that angle 580 is less than 90 degrees, preferably between 1 and 5 degrees, relative to the propagation direction of fundamental laser pulses 191F from laser gain medium 116 toward output coupler 114, such that phase matching between fundamental laser pulses 191F, second-harmonic laser pulses 192S, and third-harmonic laser pulses 193T is achieved for the higher-power fundamental laser pulses 191F propagating in this direction. (In an alternative implementation, angle 580 is greater than 90 degrees, such that phase matching between fundamental laser pulses 191F, second-harmonic laser pulses 192S, and third-harmonic laser pulses 193T is achieved for the fundamental laser pulses 191F propagating from output coupler 114 toward laser gain medium 116.)

Due to non-zero angle 580 between fundamental laser pulses 191F and second-harmonic laser pulses 192S, third-harmonic laser pulses 193T emerge from intracavity nonlinear crystal 140 at a non-zero angle with respect to residual second-harmonic laser pulses 192Sr. Thus, in one embodiment, no dichroic mirror is needed to separate third-harmonic laser pulses 193T from residual second-harmonic laser pulses 192Sr. If, however, the angle between third-harmonic laser pulses 193T and residual second-harmonic laser pulses 192Sr is too small, pulsed THG laser system 500 may further include extra-cavity dichroic mirror 454 for splitting third-harmonic laser pulses 193T from residual second-harmonic laser pulses 192Sr outside the laser resonator.

In embodiments of pulsed THG laser system 500 that include lenses 420 and 422, these lenses may be positioned outside the beam path of second-harmonic laser pulses 192S/192Sr and third-harmonic laser pulses 193T (as shown in FIG. 5) or in the beam path of second-harmonic laser pulses 192S/192Sr and third-harmonic laser pulses 193T. In the example depicted in FIG. 5, the laser resonator of pulsed laser 110 is a linear resonator formed by output coupler 114 and a mirror 112. As discussed above in reference to FIG. 1, pulsed laser 110 may include additional reflectors to form a linear resonator with a folded geometry, or a ring resonator. A nanosecond embodiment of pulsed THG laser system 500 may include Q-switch 118. Pulsed THG laser system 500 may implement cavity-dumping, as discussed above in reference to FIG. 1.

Figure 6:
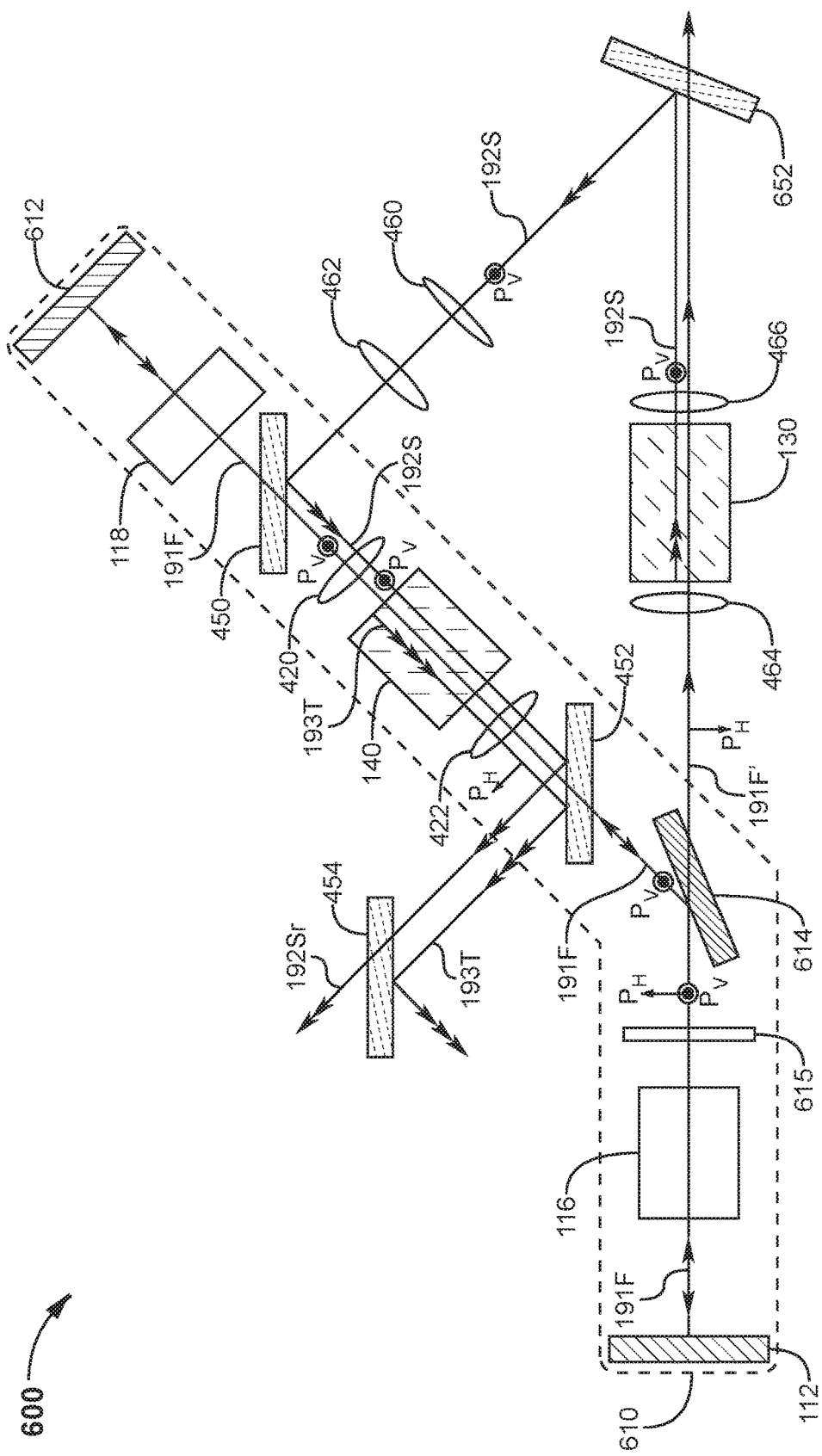
FIG. 6 illustrates a pulsed THG laser system with intracavity THG based on extra-cavity SHG and configured with adjustable, polarization-based output coupling from the laser resonator of fundamental laser pulses for the extra-cavity SHG, according to an embodiment.

FIG. 6 illustrates one pulsed THG laser system 600 with adjustable, polarization-based output coupling of fundamental laser pulses 191F'. Pulsed THG laser system 600 is an embodiment of pulsed THG laser system 100 that implements pulsed laser 100 as a pulsed laser 610 with a folded linear resonator including mirrors 112 and 612, a polarizing beamsplitter 614, an adjustable waveplate 615, and an extra-cavity dichroic mirror 652. Adjustable waveplate plate 615 and polarizing beamsplitter 614 cooperate to form an adjustable embodiment of output coupler 114. Mirrors 112 and 612 are high-reflectors and may have a reflectivity of at least 99% in the wavelength range of fundamental laser pulses 191F.

In addition to adjustable output coupling, THG laser system 600 offers a simpler approach to synchronization between second-harmonic laser pulses 192S and fundamental laser pulses 191F in intracavity nonlinear crystal 140, as compared to THG laser system 400. On the other hand, at least some embodiments of THG laser system 400 offer the advantage of performing THG with fundamental laser pulses 191F before partial output coupling thereof, whereas THG laser system 600 performs THG after output coupling and therefore with lower-power fundamental laser pulses 191F.

Adjustable waveplate 615 alters the polarization state of fundamental laser pulses 191F in a leg of the laser resonator between mirror 112 and polarizing beamsplitter 614, hereinafter referred to as the gain-leg as it contains laser gain medium 116. Polarizing beamsplitter 614 couples one polarization component of fundamental laser pulses 191F received from the gain-leg out of the laser resonator as fundamental laser pulses 191F', and directs the orthogonal polarization component to another leg of the laser resonator between polarizing beamsplitter 614 and mirror 612, hereinafter referred to as the SFM-leg as it contains intracavity nonlinear crystal 140. Polarizing beamsplitter 614 out-couples fundamental laser pulses 191F' to extra-cavity nonlinear crystal 130. Extra-cavity dichroic mirror 652 receives the output from extra-cavity nonlinear crystal 130, transmits any residual power of fundamental laser pulses 191F', and reflects second-harmonic laser pulses 192S toward the SFM-leg of pulsed laser 610. Adjustable waveplate 615 enables adjustment of the ratio between the power of transmitted fundamental laser pulses 191F' and the power of reflected fundamental laser pulses 191F. This adjustment simplifies optimization of THG laser system 600, as compared to THG laser system 400, and may be carried out during actual operation of THG laser system.

Polarizing beamsplitter 614 may be a polarizing plate beamsplitter in order to withstand fundamental laser pulses 191F of high power, such as peak powers in the megawatt range, and minimize parasitic losses in the laser resonator of pulsed laser 610. In the example depicted in FIG. 6, polarizing beamsplitter 614 is a polarizing plate beamsplitter that reflects the S-polarized component (corresponding to vertical polarization $P_V$ when the plane of deflection of the polarizing plate beamsplitter is horizontal), and transmits and thereby out-couples the P-polarized component (corresponding to horizontal polarization $P_H$ when the plane of deflection of the polarizing plate beamsplitter is horizontal). Without departing from the scope hereof, polarizing beamsplitter 614 may be of a different type, for example a polarizing beamsplitter cube or a polarizer prism, and polarizing beamsplitter 614 may couple out vertical polarization $P_V$ instead of horizontal polarization $P_H$.

In pulsed THG laser system 600, extra-cavity nonlinear crystal 130 and intracavity nonlinear crystal 140 are both configured for type-I phase matching. Polarizing beamsplitter 614 ensures that the polarization state of fundamental laser pulses 191F' is orthogonal to the polarization state of fundamental laser pulses 191F in the SFM-leg of pulsed laser 610. Thus, with type-I phase matching in extra-cavity nonlinear crystal 130, second-harmonic laser pulses 192S have the same polarization state as fundamental laser pulses 191F in the SFM-leg of pulsed laser 610, such that no polarization rotation is required for fundamental laser pulses 191F' and second-harmonic laser pulses 192S.

Synchronization of second-harmonic laser pulses 192S with fundamental laser pulses 191F, for example as discussed above in reference to FIGS. 2 and 3, may be achieved in a relatively simple manner by translating extra-cavity dichroic mirror 652.

In the embodiment depicted in FIG. 6, pulsed THG laser system 600 is configured for collinear propagation of second-harmonic laser pulses 192S and fundamental laser pulses 191F through intracavity nonlinear crystal 140. This depicted embodiment includes intracavity dichroic mirrors 450 and 452 as well as extra-cavity dichroic mirror 454. Extra-cavity dichroic mirror 652 directs second-harmonic laser pulses 192S to intracavity dichroic mirror 450, intracavity dichroic mirrors 450 merges second-harmonic laser pulses 192S with fundamental laser pulses 191F propagating in the SFM-leg in the direction toward polarizing beamsplitter 614, intracavity dichroic mirror 452 extracts third-harmonic laser pulses 193T and residual second-harmonic laser pulses 192Sr from the laser resonator of pulsed laser 610, and extra-cavity dichroic mirror 454 separates third-harmonic laser pulses 193T from residual second-harmonic laser pulses 192Sr. In an alternative embodiment, pulsed THG laser system 600 is instead configured for non-collinear propagation of fundamental laser pulses 191F and second-harmonic laser pulses 192S in intracavity nonlinear crystal 140. This alternative embodiment does not include intracavity dichroic mirrors 450 and 452, but instead includes extra-cavity mirror 576. Extra-cavity mirror 576 directs second-harmonic laser pulses 192S through intracavity nonlinear crystal 140 at a non-zero angle with respect to the propagation direction of fundamental laser pulses 191F, as discussed above in reference to FIG. 5.

Pulsed THG laser system 600 may include one or more of lens-pair 420 and 422, lens-pair 464 and 466, and lens-pair 460 and 462, as discussed above in reference to FIGS. 4 and 5. A nanosecond embodiment of pulsed THG laser system 600 may include Q-switch 118. In one implementation of pulsed THG laser system 600, Q-switch 118 is a polarization modulator that cooperates with polarizing beamsplitter 614 to modulate a loss coefficient of the laser resonator of pulsed laser 610.

Figure 7:
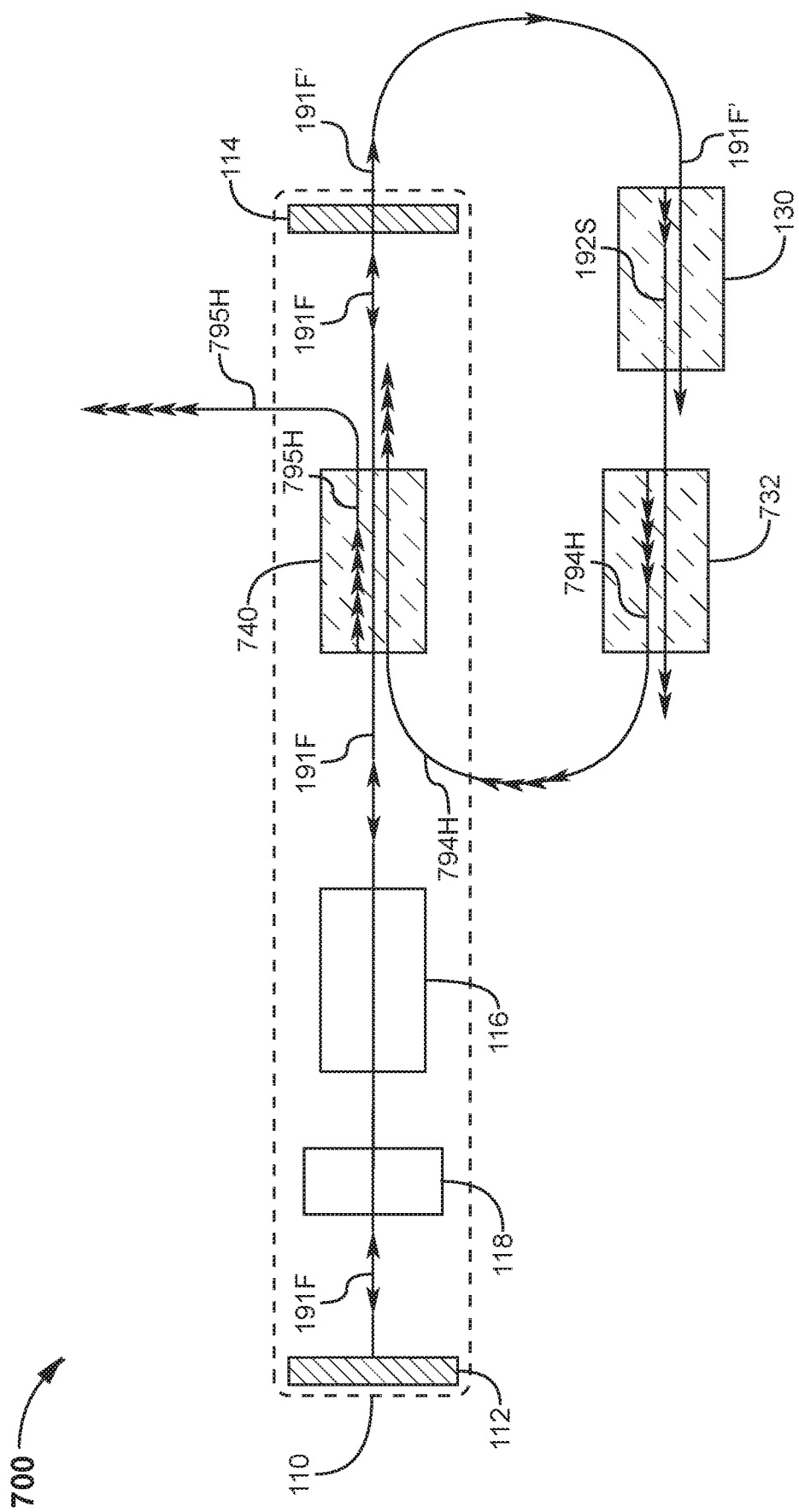
FIG. 7 illustrates a pulsed higher-harmonic HH laser system with intracavity generation of the $(2^N+1)^{th}$ harmonic aided by extra-cavity generation of the $(2^N)^{th}$ harmonic, wherein N is an integer greater than one, according to an embodiment.

FIG. 7 illustrates one pulsed higher-harmonic (HH) laser system 700 with intracavity generation of the $(2^N+1)^{th}$ harmonic aided by extra-cavity generation of the $(2^N)^{th}$ harmonic, wherein N is an integer greater than one. Pulsed HH laser system 700 is an extension of pulsed THG laser system 100 that performs two or more sequential stages of extra-cavity SHG to generate the $(2^N)^{th}$ harmonic and uses the $(2^N)^{th}$ harmonic in intracavity SFM to generate the $(2^N+1)^{th}$ harmonic. As compared to pulsed THG laser system 100, pulsed HH laser system 700 thus includes at least one additional extra-cavity nonlinear crystal 732 following extra-cavity nonlinear crystal 130.

In the example depicted in FIG. 7, pulsed HH laser system 700 is configured with a single additional extra-cavity nonlinear crystal 732 that receives second-harmonic laser pulses 192S from extra-cavity nonlinear crystal 130 and frequency-doubles second-harmonic laser pulses 192S to generate fourth-harmonic laser pulses 194H. In this example, pulsed HH laser system 700 directs fourth-harmonic laser pulses 194H back into the laser resonator of pulsed laser 110 to perform SFM with fundamental laser pulses 191F in intracavity nonlinear crystal 140 and thereby generate fifth-harmonic laser pulses 195F. More generally, however, pulsed HH laser system 700 includes a plurality M of extra-cavity nonlinear crystals arranged in series (with extra-cavity nonlinear crystal 130 being the first one of these extra-cavity nonlinear crystals). Each of these M extra-cavity nonlinear crystals frequency-doubles its input. The M extra-cavity nonlinear crystals thereby cooperate to generate an $N^{th}$ harmonic of fundamental laser pulses 191F', wherein $N=2^M$. In turn, intracavity nonlinear crystal 140 generates the $(N+1)^{th}$ harmonic of fundamental laser pulses 191F.

In embodiments of pulsed HH laser system 700 where pulsed laser 110 generates near-infrared fundamental laser pulses 191F (e.g., when laser gain medium 116 is a rare-earth doped YAG crystal), pulsed HH laser system 700 is capable of reaching deeper into the ultraviolet spectrum than pulsed THG laser system 100.

Pulsed HH laser system 700 may be implemented according to the optical designs of any one of pulsed THG laser system 400, pulsed THG laser system 500, and pulsed THG laser system 600, extended to include a plurality of sequential extra-cavity nonlinear crystals. Pulsed HH laser system 700 may utilize either one of the synchronization schemes shown in FIGS. 2 and 3.

Figure 8:
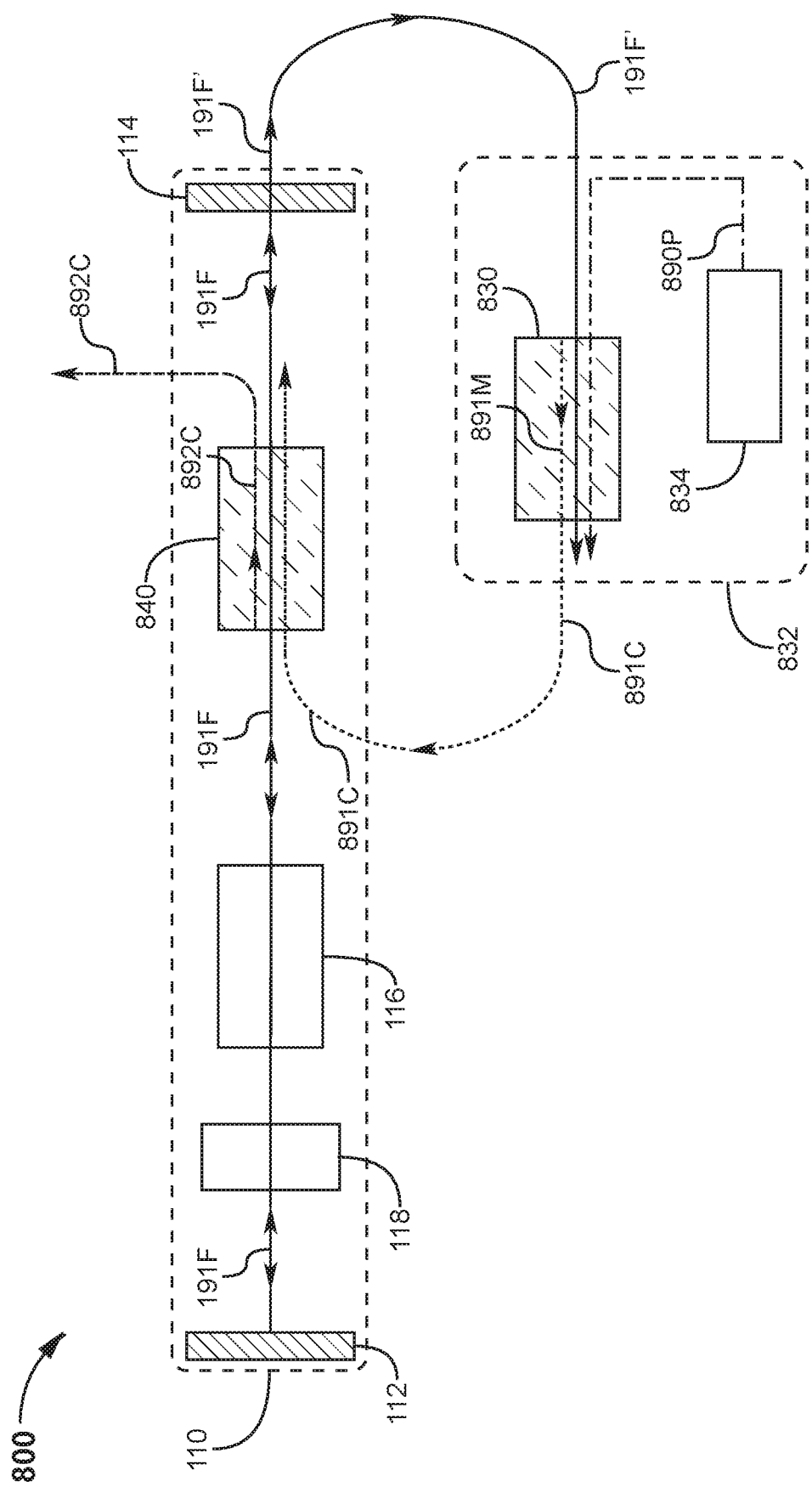
FIG. 8 illustrates a frequency-modified pulsed laser system with intracavity frequency-conversion aided by extra-cavity frequency conversion, according to an embodiment.

FIG. 8 illustrates one frequency-modified pulsed laser system 800 with intracavity frequency-conversion aided by extra-cavity frequency conversion. Pulsed laser system 800 is a generalization of pulsed THG laser system 100 that is not limited to the extra-cavity and intracavity frequency conversions being SHG and THG, respectively. Pulsed laser system 800 performs extra-cavity frequency-conversion in an extra-cavity frequency-conversion device 832 that includes an extra-cavity nonlinear crystal 830 and a laser 834. Laser 834 generates laser radiation 890P. Extra-cavity frequency-conversion device 832 mixes fundamental laser pulses 191F' with laser radiation 890P in extra-cavity nonlinear crystal 830 to generate frequency-converted laser pulses 891C via SFM or difference-frequency-mixing (DFM). Pulsed laser system 800 directs frequency-converted laser pulses 891C back into the laser resonator of pulsed laser 110 to mix with fundamental laser pulses 191F in an intracavity nonlinear crystal 840. Intracavity nonlinear crystal 840 generates frequency-converted laser pulses 892C via SFM or DFM of fundamental laser pulses 191F and frequency-converted laser pulses 891C.

As compared to pulsed THG laser system 100, the design of pulsed laser system 800 is more versatile, and may be adapted to convert fundamental laser pulses 191F to frequency-converted laser pulses 892C of a variety of wavelengths depending on (a) the wavelength of laser radiation 890P, (b) choice of SFM or DFM in extra-cavity nonlinear crystal 830, and (c) choice of SFM or DFM in intracavity nonlinear crystal 840.

Laser radiation 890P may be of shorter or longer wavelength than fundamental laser pulses 191F'. In one embodiment, extra-cavity frequency-conversion device 832 is an optical parametric amplifier or an optical parametric oscillator, wherein laser radiation 890P and fundamental laser pulses 191F' are the pump and signal waves, and frequency-converted laser pulses 891C are the resulting idler wave. This embodiment of pulsed laser system 800 is for example implemented with a near-infrared pulsed laser 110 and SFM in intracavity nonlinear crystal 840 to generate frequency-converted laser pulses 892C in the visible spectrum.

In one embodiment, pulsed laser 110 of pulsed laser system 800 is a 1064-nanometer Nd:YAG laser, and frequency-conversion device 832 is an optical parametric oscillator that generates 1320-nanometer laser pulses 891C, such that SFM in intracavity nonlinear crystal 840 results in the wavelength of frequency-converted laser pulses 892C being 589.2 nanometers. This implementation of pulsed laser system 800 may be used as a sodium guide star.

Pulsed laser system 800 may be implemented according to the optical designs of any one of pulsed THG laser system 400, pulsed THG laser system 500, and pulsed THG laser system 600, with extra-cavity nonlinear crystal 130 and intracavity nonlinear crystal 140 replaced by extra-cavity frequency-conversion device 832 and intracavity nonlinear crystal 840, respectively. Pulsed laser system 800 may utilize either one of the synchronization schemes shown in FIGS. 2 and 3. Extra-cavity nonlinear crystal 830 may have properties similar to extra-cavity nonlinear crystal 130, and intracavity nonlinear crystal 840 may have properties similar to intracavity nonlinear crystal 140.

Figure 9:
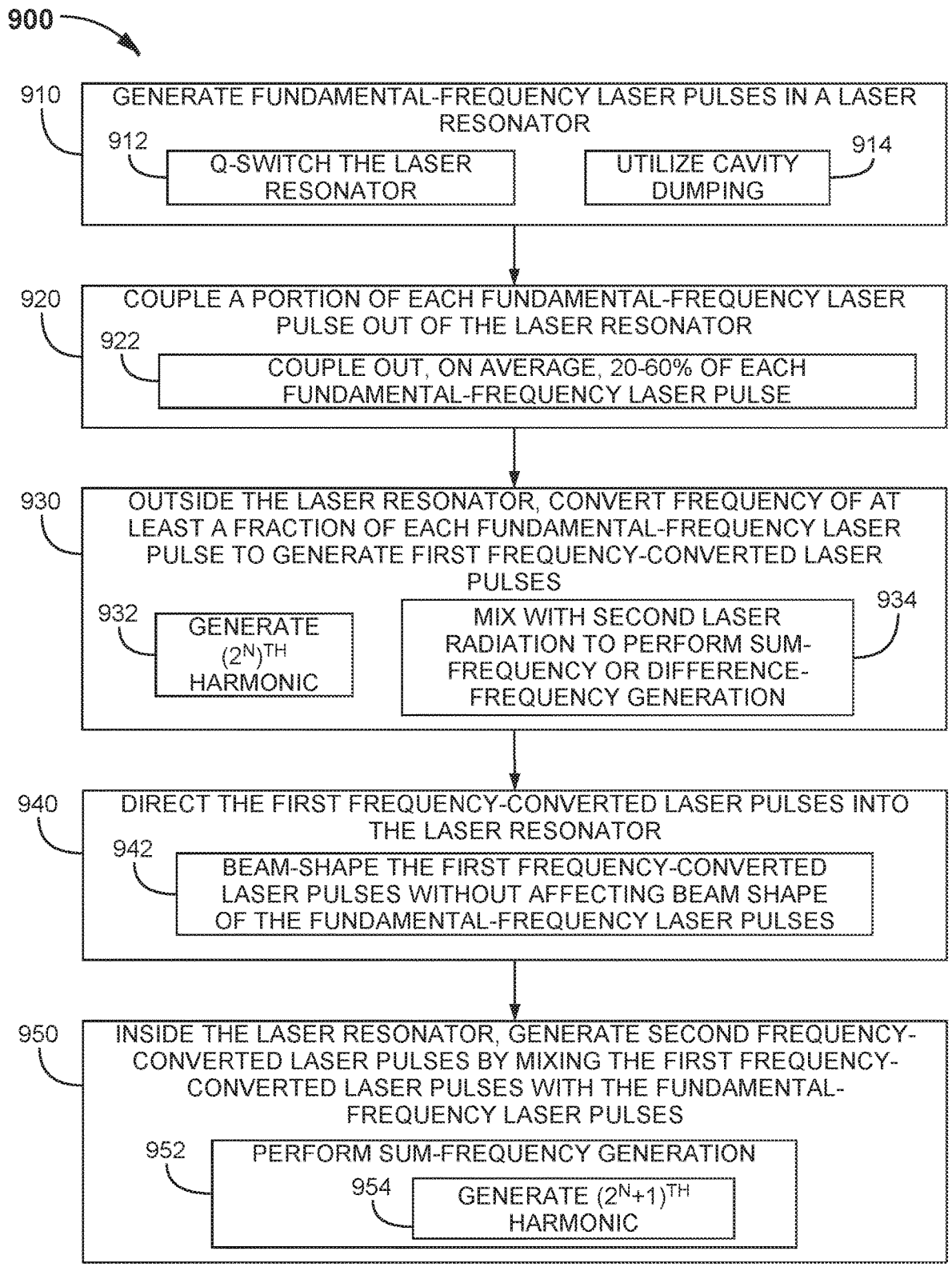
FIG. 9 illustrating a method for frequency conversion of pulsed laser radiation, according to an embodiment.

FIG. 9 is a flowchart illustrating one method 900 for frequency conversion of pulsed laser radiation. Certain embodiments of method 900 may be performed by pulsed THG laser system 100, other embodiments of method 900 may be performed by pulsed HH laser system 700, and yet other embodiments of method 900 may be performed by pulsed laser system 800. Method 900 includes steps 910, 920, 930, 940, and 950.

Step 910 generates fundamental laser pulses in a laser resonator. In one example of step 910, pulsed laser 110 (as implemented in any one of pulsed THG laser system 100, pulsed HH laser system 700, and pulsed laser system 800) generates fundamental laser pulses 191F. In one embodiment, step 910 includes a step 912 of Q-switching the laser resonator to form the fundamental laser pulses. In one example of step 912, Q-switch 118 modulates the quality factor of the laser resonator of pulsed laser 110. In another embodiment, step 910 includes a step 914 of utilizing cavity-dumping to form the fundamental laser pulses, for example as discussed above in reference to FIG. 1. Steps 912 and 914 may be used alone or in combination to form nanosecond fundamental laser pulses. In yet another embodiment, not explicitly indicated in FIG. 9, step 910 utilizes mode-locking to form the fundamental laser pulses. This embodiment may be applied to form picosecond or femtosecond fundamental laser pulses.

Step 920 couples a portion of each fundamental laser pulse out of the laser resonator. In one example of step 920, output coupler 114 couples fundamental laser pulses 191F' out of the laser resonator of pulsed laser 410. In certain embodiments, step 920 implements a step 922 of coupling out, on average, 20-60% of each fundamental laser pulse, for example as discussed above in reference to FIG. 1.

Step 930 is performed outside the laser resonator. Step 930 generates first frequency-converted laser pulses by converting the frequency of at least a fraction of each fundamental laser pulse. In one embodiment, step 930 implements a step 932 of generating the $(2^N)^{th}$ harmonic of the fundamental laser pulses, wherein N is a positive integer. This embodiment of step 930 is, for example, performed by pulsed THG laser system 100 to generate the second harmonic of the fundamental laser pulses (N=1), or by pulsed HH laser system 700 to generate the $4^{th}$, $8^{th}$, ... harmonic of the fundamental laser pulses (N>1), as discussed above in reference to FIGS. 1 and 7, respectively. In another embodiment, step 930 implements a step 934 of mixing the fundamental laser pulses with laser radiation received from a secondary laser to perform SFM or DFM. This embodiment of step 930 is, for example, performed by pulsed laser system 800, as discussed above in reference to FIG. 8.

Step 940 directs the first frequency-converted laser pulses back into the laser resonator, where step 950 generates second frequency-converted laser pulses by mixing the first frequency-converted laser pulses with the fundamental laser pulses. Step 940 may be performed as discussed above in reference to any one of FIGS. 4, 5, and 6. For example, step 940 may utilize extra-cavity mirror 474 and intracavity dichroic mirror 450. Step 940 may include a step 942 of beam-shaping the first frequency-converted laser pulses without affecting the beam-shape of the intracavity fundamental laser pulses, for example as discussed above in reference to FIG. 4. In one embodiment, step 940 directs the first frequency-converted laser pulses to collinearly propagate with the fundamental laser pulses in step 950. In another embodiment, step 940 directs the first frequency-converted laser pulses to propagate at a non-zero angle with respect to the fundamental laser pulses in step 950. In either of these two embodiments, step 940 may direct the first frequency-converted laser pulses to phase match, in step 950, with the fundamental laser pulses propagating in the direction from the laser gain medium toward the output coupler, so as to benefit from the higher, pre-outcoupling power of the fundamental laser pulses.

In one example of step 950, intracavity nonlinear crystal 140 generates third-harmonic laser pulses 193T by SFM of fundamental laser pulses 191F and second-harmonic laser pulses 192S, as discussed above in reference to FIG. 1. In another example of step 950, intracavity nonlinear crystal 140 generates the $(2^N+1)^{th}$ harmonic of fundamental laser pulses 191F by SFM of fundamental laser pulses 191F and the $(2^N)^{th}$ harmonic thereof (N>1), as discussed above in reference to FIG. 7. In yet another example of step 950, intracavity nonlinear crystal 840 generates frequency-converted laser pulses 892C by SFM or DFM of fundamental laser pulses 191F and frequency-converted laser pulses 891C, as discussed above in reference to FIG. 8. In one embodiment, step 950 implements a step 952 of performing SFM such that the second frequency-converted laser pulses have shorter wavelength than both the fundamental laser pulses and the first frequency-converted laser pulses. For example, step 952 may implement a step 954 of generating the $(2^n+1)^{th}$ harmonic, wherein n is a positive integer, as discussed above in reference to FIGS. 1 and 7.

Method 900 may apply either one of the synchronization schemes shown in FIGS. 2 and 3 to synchronize the first frequency-converted laser pulses with the fundamental laser pulses for optimal frequency-conversion in step 950. Especially if operating according to the synchronization scheme of FIG. 3, method 900 may advantageously utilize active adjustment of a path length of at least one of (i) the fundamental laser pulses between steps 920 and 930 and (ii) the first frequency-converted laser pulses between steps 930 and 950, to optimize the phase and/or temporal overlap between the first frequency-converted laser pulses and the fundamental laser pulses in step 950.

Figure 10:
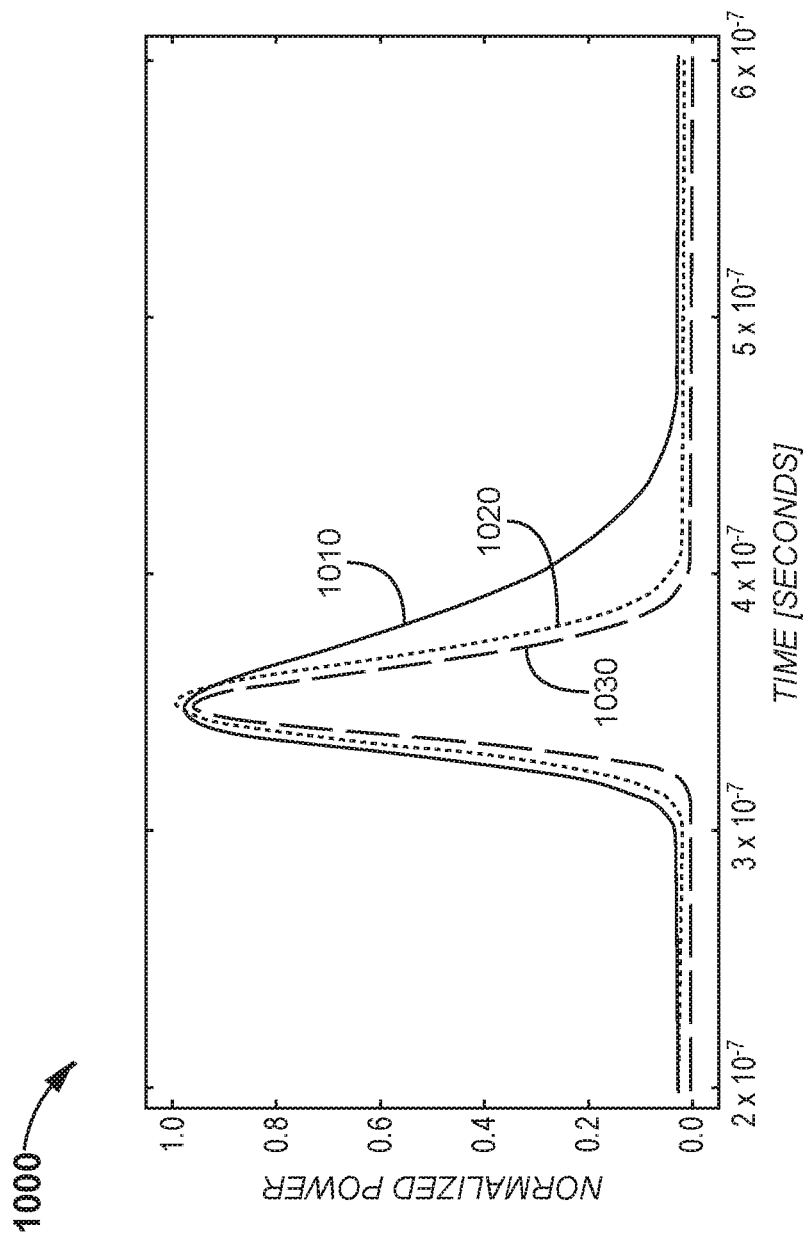
FIG. 10 shows pulse synchronization modeled for an example of the pulsed THG laser system of FIG. 4.

Example 1: Pulse Synchronization in UV Nanosecond Embodiment of Pulsed THG Laser System FIG. 10 is a diagram 1000 that shows pulse synchronization modeled for one example of pulsed THG laser system 400. In this example of pulsed THG laser system 400, laser gain medium 116 is a diode-pumped, rare-earth doped YAG crystal, intracavity dichroic mirrors 450 and 452 are arranged to copropagate second-harmonic laser pulses 192S with fundamental laser pulses 191F propagating in the direction from laser gain medium 116 toward output coupler 114, and pulsed laser 110 is Q-switched to generating fundamental laser pulses 191F with a pulse width of approximately 80 nanoseconds. Fundamental laser pulses 191F are near-infrared, second-harmonic laser pulses 192S are green, and third-harmonic laser pulses 193T are ultraviolet. Path length L from output coupler 114 via extracavity nonlinear crystal 130 to intracavity nonlinear crystal 140 is 0.6 meters.

Diagram 1000 shows pulse powers as a function of time in intracavity nonlinear crystal 140. Diagram 1000 plots (a) the power envelope 1010 of one fundamental laser pulse 191F as it passes through intracavity nonlinear crystal 140 in the direction toward output coupler 114, (b) the power envelope 1020 of a second-harmonic laser pulse 192S generated therefrom, and (c) the power envelope 1030 of a third-harmonic laser pulse 193T generated from the fundamental laser pulse 191F and second-harmonic laser pulse 192S. To clarify the temporal relationships therebetween, power envelopes 1010, 1020, and 1030 are scaled to approximately identical peak powers in diagram 1000.

The temporal overlap at intracavity nonlinear crystal 140 between fundamental laser pulse 191F and second-harmonic laser pulse 192S generated therefrom is excellent. The peak of second-harmonic laser pulse 192S is only 2 nanoseconds delayed from the peak of fundamental laser pulse 191F, which is far less than the 80-nanosecond pulse width of fundamental laser pulses 191F. Second-harmonic laser pulse 192S is shorter than fundamental laser pulse 191F, and third-harmonic laser pulses 193T is shorter than second-harmonic laser pulses 192S.

Figure 11:
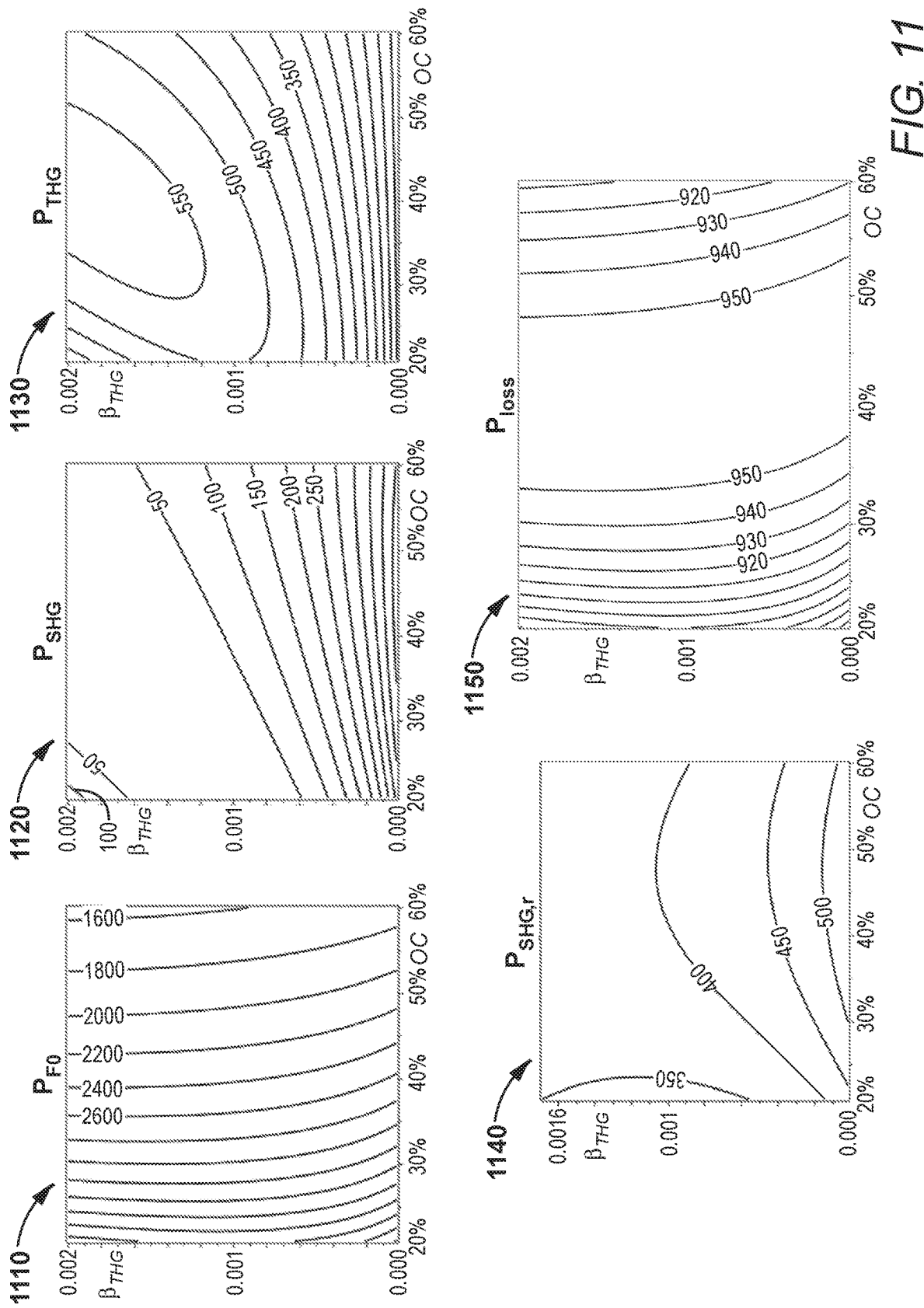
FIG. 11 shows laser pulse powers modeled for an example of the pulsed THG laser system of FIG. 4.

Example 2: Power Modeling in UV Nanosecond Embodiment of Pulsed THG Laser System with THG Based on Pre-Outcoupled Fundamental Power FIG. 11 is a set of contour plots of laser pulse powers modeled for one example of pulsed THG laser system 400 similar to the one of Example 1. This model is in a continuous-wave regime, and powers calculated with this model are assumed to be equivalent to average powers of pulsed radiation. In the present example, pulsed laser 110 has an optimal output coupling efficiency of 50%, and it is assumed that the average power of fundamental laser pulses 191F' is 1 kilowatt when output coupler 114 outputs 50% of the fundamental intracavity power.

The present model is based on the following expressions:

$$P_{THG} = \frac{3}{2} sn\left(\frac{\sqrt{6\beta_{THG}P_{F0}(1-\delta_0)}}{3}, \frac{P_{SHG}}{2P_{F0}(1-\delta_0)}\right)^2 P_{SHG}$$

$$P_{F1} = P_{F0}(1-\delta_0) - \frac{1}{3}P_{THG}$$

$$P_{F2} = P_{F1}(1-OC)$$

$$P_{F,OC} = P_{F1} \cdot OC$$

$$P_{F,r} = P_{F,OC} - P_{SHG}$$

$$P_{SHG,r} = P_{SHG} - \frac{2}{3}P_{THG}$$

$$P_{loss} = P_{THG} + P_{SHG,r} + P_{F,r}$$

$$P_{F3} = P_{F2}\exp\left(\frac{G_0}{1+\frac{P_{F0}+P_{F2}}{P_{sat}}}\right)$$

Here, sn is the Jacobi elliptic function, $P_{F0}$ is the average power of fundamental laser pulses 191F incident on intracavity nonlinear crystal 140 from the direction of laser gain medium 116, $P_{F1}$ is the average power of fundamental laser pulses 191F incident on output coupler 114 after passing through intracavity nonlinear crystal 140, $P_{F2}$ is the average power of fundamental laser pulses 191F incident of laser gain medium 116 from the direction of output coupler 114, $P_{F3}$ is the average power of fundamental laser pulses 191F after passing through laser gain medium 116 in the direction toward intracavity nonlinear crystal 140, OC is the output coupling efficiency of output coupler 114, $P_{F,OC}$ is the average power of fundamental laser pulses 191F', $P_{SHG}$ is the average power of second-harmonic laser pulses 192S generated in extra-cavity nonlinear crystal 130, $P_{THG}$ is the average power of third-harmonic laser pulses 193T generated in intracavity nonlinear crystal 140, $P_{F,r}$ is the average residual power of fundamental laser pulses 191F' after SHG in extra-cavity nonlinear crystal 130, $P_{SHG,r}$ is the average power of residual second-harmonic laser pulses 192Sr after THG in intracavity nonlinear crystal 140, $P_{THG}$ is the average power of third-harmonic laser pulses 193T, $P_{loss}$ is thus the average power of laser radiation lost from the laser resonator of pulsed laser 110 to perform frequency conversion, $\delta_0$ is the intrinsic loss of the laser resonator, $\beta_{THG}$ is a THG conversion parameter (sensitive to material properties of intracavity nonlinear crystal 140 and spatial beam parameters of fundamental laser pulses 191F and second-harmonic laser pulses 192S therein), $\beta_{SHG}$ is an SHG conversion efficiency of extra-cavity nonlinear crystal 130, $G_0$ is a gain coefficient of laser gain medium 116, and $P_{sat}$ is an equivalent average saturation power of laser gain medium 116.

The present model requires that $$P_{F3}=P_{F0},$$

and $$P_{SHG}=\tan h(\sqrt{P_{F,OC}\beta_{SHG}})^2 P_{F,OC}.$$

Contour plots 1110, 1120, 1130, 1140, and 1150 show $P_{F0}$, $P_{SHG}$, $P_{THG}$, $P_{SHG,r}$, $P_{loss}$, respectively, each plotted as a function of the output coupling efficiency OC and the THG conversion parameter $\beta_{THG}$. Contour plot 1110 uses a contour interval of 200 watts. Contour plots 1120, 1130, and 1140 use a contour interval of 50 watts. Contour plot 1150 uses a contour interval of 10 watts. It is assumed that $P_{sat}$=300 watts, $\delta_0$=0.1, $G_0$=9, and $\beta_{SHG}$=0.001. The model explores values of OC in the range from 20% to 60%, and values of $\beta_{THG}$ in the range from 0 to 0.002. A $\beta_{THG}$ value of 0.001 is relatively easily achieved with high-power laser pulses and, for example, with a 5-millimeter long lithium triborate crystal and a beam waist diameter of 50 microns, wherein peak powers in the megawatt range may be achieved.

As seen in contour plot 1130, a maximum average third-harmonic power $P_{THG}$ in slight excess of 550 watts is achieved with $\beta_{THG}\approx 0.002$ and OC$\approx$40%. Thus, at least in the present example of pulsed THG laser system 400, the overall conversion efficiency of fundamental laser pulses 191F to third-harmonic laser pulses 193T benefits from a substantial portion of fundamental laser pulses 191F being coupled out of the laser resonator for extra-cavity SHG. With $\beta_{THG}\approx 0.002$ and OC$\approx$40%, the average intracavity power $P_{F0}$ in contour plot 1110 is approximately 2.4 kilowatts, such that the overall conversion efficiency of fundamental laser pulses 191F to third-harmonic laser pulses 193T is nearly 25%. A lower output coupling efficiency OC corresponds to a higher average intracavity power $P_{F0}$, potentially exceeding the safe operating range of the laser resonator of pulsed THG laser system 400. This illustrates how pulsed THG laser system 400 is designed to optimally convert fundamental laser pulses 191F to third-harmonic laser pulses 193T while inherently reducing the risk of intracavity damage.

In a scenario where $\beta_{THG}\approx 0.001$, a maximum average third-harmonic power THG of approximately 525 watts is achieved with OC 30%, which corresponds to a higher average intracavity power $P_{F0}$ of approximately 3.0 kilowatts. The average intracavity power $P_{F0}$ may be reduced by increasing OC. For example, an output coupling efficiency increase to OC 40% reduces the average intracavity power $P_{F0}$ to approximately 2.4 kilowatts, which may substantially aid damage prevention, while only slightly impacting the average third-harmonic power $P_{THG}$.

Figure 12:
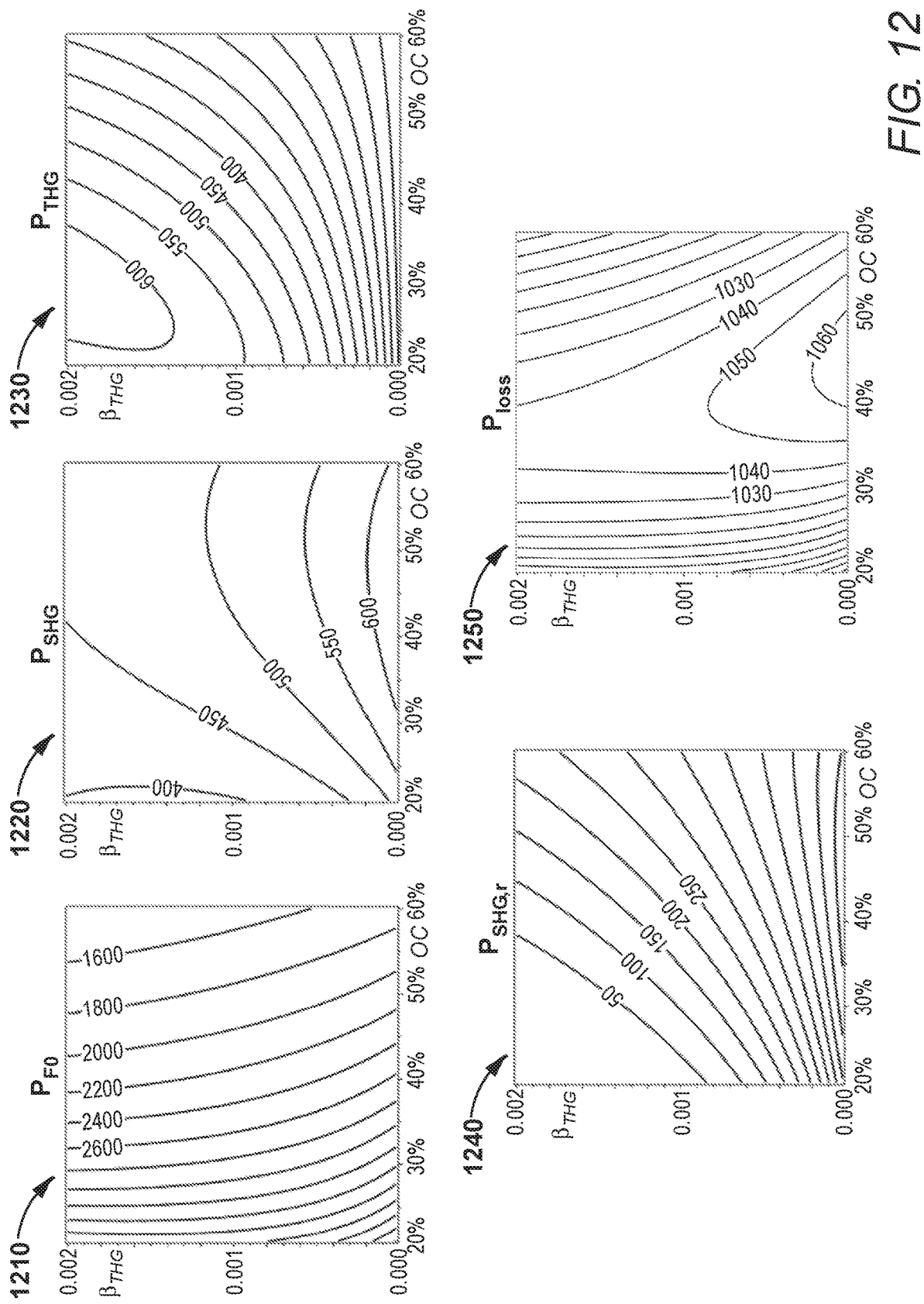
FIG. 12 shows laser pulse powers modeled for an example of the pulsed THG laser system of FIG. 6.

Example 3: Power Modeling in UV Nanosecond Embodiment of Pulsed THG Laser System with THG Based on Post-Outcoupled Fundamental Power FIG. 12 is a set of contour plots of laser pulse powers modeled for one example of pulsed THG laser system 600.

Thus, in the present example, second-harmonic laser pulses 192S are phase-matched, in intracavity nonlinear crystal 140, with fundamental laser pulses 191F in a part of their propagation path that is after outcoupling by (polarizing beamsplitter 614) and before the next pass through laser gain medium 116. As in Example 2, this model is in a continuous-wave regime, and powers calculated with this model are assumed to be equivalent to average powers of pulsed radiation.

The Example 3 model is based on the following expressions:

$$P_{THG} = \frac{3}{2} sn\left(\frac{\sqrt{6\beta_{THG}P_{F2}}}{3}, \frac{P_{SHG}}{2P_{F2}}\right) P_{SHG}$$

$$P_{F1} = P_{F0}(1 - OC)$$

$$P_{F2} = P_{F1}(1 - \delta_0)$$

$$P_{F3} = P_{F2} - \frac{P_{THG}}{3}$$

$$P_{F,OC} = P_{F0} \cdot OC$$

$$P_{F,r} = P_{F,OC} - P_{SHG}$$

$$P_{SHG,r} = P_{SHG} - \frac{2}{3}P_{THG}$$

$$P_{loss} = P_{THG} + P_{SHG,r} + P_{F,r}$$

$$P_{F4} = P_{F3}\exp\left(\frac{G_0}{1 + \frac{P_{F0} + P_{F3}}{P_{sat}}}\right)$$

Here, sn is the Jacobi elliptic function, $P_{F0}$ is the average power of fundamental laser pulses 191F incident on output polarizing beamsplitter 614 from the direction of laser gain medium 116, $P_{F1}$ is the average power of fundamental laser pulses 191F propagating toward intracavity nonlinear crystal 140 from the direction of polarizing beamsplitter 614, $P_{F2}$ is the average power of fundamental laser pulses 191F incident of intracavity nonlinear crystal 140 from the same direction as second-harmonic laser pulses 192S, $P_{F3}$ is the average power of fundamental laser pulses 191F after passing through intracavity nonlinear crystal 140 in the direction toward polarizing beamsplitter 614, $P_{F4}$ is the average power of fundamental laser pulses 191F propagating toward polarizing beamsplitter 614 after two passes through laser gain medium 116, OC is the output coupling efficiency of the output coupler formed by adjustable waveplate plate 615 and polarizing beamsplitter 614, $P_{F,OC}$ is the average power of fundamental laser pulses 191F', $P_{SHG}$ is the average power of second-harmonic laser pulses 192S generated in extra-cavity nonlinear crystal 130, $P_{THG}$ is the average power of third-harmonic laser pulses 193T generated in intracavity nonlinear crystal 140, $P_{F,r}$ is the average residual power of fundamental laser pulses 191F' after SHG in extra-cavity nonlinear crystal 130, $P_{SHG,r}$ is the average power of residual second-harmonic laser pulses 192Sr after THG in intracavity nonlinear crystal 140, $P_{THG}$ is the average power of third-harmonic laser pulses 193T, $P_{loss}$ is thus the average combined power of laser radiation lost from the laser resonator of pulsed laser 110, $\delta_0$ is the intrinsic loss of the laser resonator, $\beta_{THG}$ is a THG conversion parameter (sensitive to material properties of intracavity nonlinear crystal 140 and spatial beam parameters of fundamental laser pulses 191F and second-harmonic laser pulses 192S therein), $\beta_{SHG}$ is an SHG conversion efficiency of extra-cavity nonlinear crystal 130, $G_0$ is a gain coefficient of laser gain medium 116, and $P_{sat}$ is a saturation power of laser gain medium 116.

The present model requires that $$P_{F4} = P_{F0},$$

and $$P_{SHG} = \tan h(\sqrt{P_{F,OC}\beta_{SHG}})^2 P_{F,OC}.$$

Contour plots 1210, 1220, 1230, 1240, and 1250 show $P_{F0}$, $P_{SHG}$, $P_{THG}$, $P_{SHG,r}$, $P_{loss}$, respectively, each plotted as a function of the output coupling efficiency OC and the THG conversion parameter $\beta_{THG}$. Contour plot 1210 uses a contour interval of 200 watts. Contour plots 1220, 1230, and 1240 use a contour interval of 50 watts. Contour plot 1250 uses a contour interval of 10 watts. It is assumed that $P_{sat}=300$ watts, $\delta_0=0.1$, $G_0=9$, and $\beta_{SHG}=0.001$. The model explores values of OC in the range from 20% to 60%, and values of $\beta_{THG}$ in the range from 0 to 0.002.

As seen in contour plot 1230, a maximum average third-harmonic power $P_{THG}$ in slight excess of 600 watts is achieved with $\beta_{THG}\approx 0.002$ and OC$\approx 30\%$. Thus, at least in the present example of pulsed THG laser system 600, the overall conversion efficiency of fundamental laser pulses 191F to third-harmonic laser pulses 193T benefits from a substantial portion of fundamental laser pulses 191F being coupled out of the laser resonator for extra-cavity SHG. However, as compared to the results for pulsed THG laser system 400 in Example 2, the optimal outcoupling efficiency is lower, which is consistent with intracavity THG in pulsed THG laser system 600 being performed with post-outcoupled fundamental laser pulses 191F. With $\beta_{THG}\approx 0.002$ and OC$\approx 30\%$, the average intracavity power $P_{F0}$ is approximately 2.8 kilowatts, such that the overall conversion efficiency of fundamental laser pulses 191F to third-harmonic laser pulses 193T, as in Example 2, is nearly 25%. As seen in Example 2, a lower output coupling efficiency OC corresponds to a higher average intracavity power $P_{F0}$, potentially exceeding the safe operating range of the laser resonator of pulsed THG laser system 600. This illustrates how pulsed THG laser system 600 is designed to optimally convert fundamental laser pulses 191F to third-harmonic laser pulses 193T while inherently reducing the risk of intracavity damage.

In a scenario where $\beta_{THG}\approx 0.001$, a maximum average third-harmonic power $P_{THG}$ of approximately 550 watts is achieved with OC$\approx 20\%$, which, however, corresponds to a significantly higher average intracavity power $P_{F0}$ of approximately 3.7 kilowatts. As in Example 2, the average intracavity power $P_{F0}$ may be reduced by increasing OC. For example, an output coupling efficiency increase to OC$\approx 37\%$ reduces the average intracavity power $P_{F0}$ to approximately 2.4 kilowatts, which may substantially aid damage prevention, while the average third-harmonic power $P_{THG}$ drops to approximately 475 watts. This drop in average third-harmonic power $P_{THG}$ is greater than the corresponding drop seen in Example 2, which is a consequence of pulsed THG laser system 600 performing THG in the post-outcoupled fundamental laser pulses 191F as opposed to the pre-outcoupled fundamental laser pulses 191F.

The present invention is described above in terms of a preferred embodiment and other embodiments. The invention is not limited, however, to the embodiments described and depicted herein. Rather, the invention is limited only by the claims appended hereto.

What is claimed is:

1. A pulsed laser system, comprising:
a pulsed laser configured to generate fundamental laser pulses in a laser resonator, the laser resonator including an output coupler for outputting a portion of each fundamental laser pulse;
an extra-cavity nonlinear crystal, external to the laser resonator, for frequency-doubling at least a fraction of each fundamental laser pulse received from the output coupler, so as to generate second-harmonic laser pulses; and
an intracavity nonlinear crystal, located in the laser resonator, for generation of third-harmonic laser pulses from sum-frequency mixing of (a) the fundamental laser pulses as propagating in the laser resonator and (b) the second-harmonic laser pulses as received from the extra-cavity nonlinear crystal.

2. The pulsed laser system of claim 1, wherein the laser resonator includes a Q-switch.

3. The pulsed laser system of claim 2, wherein the output coupler is an output coupling mirror partially transmissive to the fundamental laser pulses.

4. The pulsed laser system of claim 2, wherein the output coupler has an output coupling efficiency in the range between 20% and 50%.

5. The pulsed laser system of claim 1, wherein the pulsed laser is a cavity-dumped laser, and the laser resonator includes an adjustable modulator configured to control loss of the laser resonator, perform cavity dumping, and function as the output coupler.

6. The pulsed laser system of claim 1, wherein the pulsed laser is a solid-state laser configured to generate the fundamental laser pulses with an average power of at least 1000 watts in the laser resonator.

7. The pulsed laser system of claim 1, further comprising:
a first dichroic mirror for coupling the second-harmonic laser pulses into the laser resonator such that the second-harmonic laser pulses co-propagate collinearly with the fundamental laser pulses through the intracavity nonlinear crystal; and
a second dichroic mirror for coupling the third-harmonic laser pulses out of the laser resonator.

8. The pulsed laser system of claim 7, wherein the second dichroic mirror is configured to couple the third-harmonic laser pulses and the second-harmonic laser pulses out of the laser resonator, and the pulsed laser system further comprises a third dichroic mirror external to the laser cavity and configured to separate the third-harmonic laser pulses from the second-harmonic laser pulses.

9. The pulsed laser system of claim 1, wherein the laser resonator is a linear resonator and includes a laser gain medium for light amplification to generate the fundamental laser pulses, and wherein the intracavity nonlinear crystal being between the laser gain medium and the output coupler, the pulsed laser system further comprising one or more beam-steering elements not intersecting the fundamental laser pulses in the laser resonator and each configured to steer either (i) the fundamental laser pulses to the extra-cavity nonlinear crystal or (ii) the second-harmonic laser pulses toward the laser resonator, so as to direct the second-harmonic laser pulses through the intracavity nonlinear crystal at a non-zero acute angle with respect to propagation direction of the fundamental laser pulses in direction toward the output coupler.

10. The pulsed laser system of claim 1, further comprising, externally to the laser resonator, at least one beam-shaping element for optimizing transverse mode of the second-harmonic laser pulses in the intracavity nonlinear crystal independently of beam shape of the fundamental laser pulses.

11. The pulsed laser system of claim 1, wherein a combined path length L, of (i) the fundamental laser pulses from the output coupler to the extra-cavity nonlinear crystal and (ii) the second-harmonic laser pulses from the extra-cavity nonlinear crystal to the intracavity nonlinear crystal, is less than $0.1c\tau$, wherein $\tau$ is an average pulse width of each fundamental laser pulse, c is the speed of light, and $\tau$ is at least 1 nanosecond.

12. A pulsed laser system with intracavity frequency conversion aided by extra-cavity frequency conversion, comprising:
a pulsed laser configured to generate fundamental laser pulses in a laser resonator, the laser resonator including an output coupler for outputting a portion of each fundamental laser pulse;
one or more extra-cavity nonlinear crystals, external to the laser resonator, for frequency converting at least a portion of each fundamental laser pulse received from the output coupler, so as to generate first frequency-converted laser pulses; and
an intracavity nonlinear crystal, located in the laser resonator, for generating second frequency-converted laser pulses from mixing of (a) the fundamental laser pulses as propagating in the laser resonator and (b) the first frequency-converted laser pulses as received from the extra-cavity nonlinear crystals.

13. The pulsed laser system of claim 12, wherein:
the one or more extra-cavity nonlinear crystals are a plurality M of doubling crystals, optically arranged in series, to generate the first frequency-converted laser pulses as an $N^{th}$ harmonic of the fundamental laser pulses, $N=2^M$; and
the intracavity nonlinear crystal is configured to perform sum-frequency generation so as to generate the second frequency-converted laser pulses as an $(N+1)^{th}$ harmonic of the fundamental laser pulses.

14. The pulsed laser system of claim 12, further comprising a second laser for generating a second laser radiation, the one or more extra-cavity nonlinear crystals being configured to generate the first frequency-converted laser pulses at least in part via sum-frequency-mixing or difference-frequency-mixing with the second laser radiation.

15. The pulsed laser system of claim 14, wherein the one or more extra-cavity nonlinear crystals are implemented as an optical parametric amplifier or optical parametric oscillator configured to generate the first frequency-converted laser pulses from mixing of the fundamental laser pulses with the second laser radiation.

16. The pulsed laser system of claim 14, wherein the one or more extra-cavity nonlinear crystals are implemented as a sum-frequency-generator configured to generate the first frequency-converted laser pulses from sum-frequency-mixing of the fundamental laser pulses with the second laser radiation.

17. A method for frequency conversion of pulsed laser radiation, comprising the steps of:
generating fundamental laser pulses in a laser resonator of a pulsed laser;
coupling a portion of each fundamental laser pulse out of the laser resonator via an output coupler of the laser resonator;
in one or more extra-cavity nonlinear crystals outside the laser resonator, converting the frequency of at least a fraction of each fundamental laser pulse, received from the output coupler, to generate first frequency-converted laser pulses;

directing the first frequency-converted laser pulses into the laser resonator;

in an intracavity nonlinear crystal inside the laser resonator, generating second frequency-converted laser pulses by mixing (a) the first frequency-converted laser pulses received from the one or more extra-cavity nonlinear crystals with (b) the fundamental laser pulses propagating in the laser resonator.

18. The method of claim 17, comprising:

in the converting step, a step of frequency doubling at least a fraction of each fundamental laser pulse to generate second-harmonic laser pulses; and in the generating second frequency-converted laser pulses step, a step of generating third-harmonic laser pulses from sum-frequency mixing of the second-harmonic laser pulses with the fundamental laser pulses propagating in the laser resonator.

19. The method of claim 18, wherein each of the frequency doubling and generating third-harmonic laser pulses steps utilizes type-I phase matching, the method further comprising rotating polarization of either (i) the second-harmonic laser pulses before the generating third-harmonic laser pulses step or (ii) the fundamental laser pulses between the coupling and converting steps.

20. The method of claim 17, wherein the second frequency-converted laser pulses have an average pulse width $\tau$ that is at least 1 nanosecond, the method further comprising limiting a delay between the coupling and generating second frequency-converted laser pulses steps to less than $0.1\tau$, wherein $\tau$ is an average pulse width of the fundamental laser pulse, such that the generating second frequency-converted laser pulses step mixes each fundamental laser pulse with a second frequency-converted laser pulse generated therefrom.

21. The method of claim 17, further comprising, before the generating second frequency-converted laser pulses step and without affecting beam shape of the fundamental laser pulses, beam-shaping the second frequency-converted laser pulses to optimize overlap with the fundamental laser pulses in the generating second frequency-converted laser pulses step.

22. The method of claim 17, comprising:

in the converting step, forming an $N^{th}$ harmonic of the fundamental laser pulses, N being a power of two; and in the generating second frequency-converted laser pulses step, performing sum-frequency generation so as to generate the second frequency-converted laser pulses as an $(N+1)^{th}$ harmonic of the fundamental laser pulses.

23. The method of claim 17, wherein the converting step comprises mixing the fundamental laser pulses with second laser radiation received from a secondary laser to generate the first frequency-converted laser pulses at least in part via sum-frequency-mixing or difference-frequency-mixing with the second laser radiation.

24. The method of claim 17, wherein the coupling step couples out, on average, between 20 and 50 percent of each fundamental laser pulse.

25. The method of claim 17, comprising:

in the generating fundamental laser pulses step, Q-switching the laser resonator; and in the coupling step, outputting the fundamental laser pulses through an output coupling mirror that is partially transmissive to the fundamental laser pulses.

26. The method of claim 17, comprising utilizing cavity dumping to perform the generating fundamental laser pulses and outputting steps.

27. The method of claim 17, wherein the directing step causes the first frequency-converted laser pulses to co-propagate collinearly with the fundamental laser pulses in the step of generating the second frequency-converted laser pulses.

28. The method of claim 27, wherein the laser resonator is a linear resonator having a laser gain medium used in the generating fundamental laser pulses step, and the directing step causes the first frequency-converted laser pulses to co-propagate with the fundamental laser pulses in a direction from the laser gain medium toward the output coupler.

29. The method of claim 17, wherein the directing step causes the first frequency-converted laser pulses to propagate at a non-zero angle with respect to propagation direction of the fundamental laser pulses in the generating second frequency-converted laser pulses step.

30. The method of claim 17, comprising:

generating the fundamental laser pulses with an average power of at least 1000 watts in the laser resonator; and generating the second frequency-converted laser pulses with an average power that is at least ten percent of the average power of the fundamental laser pulses.

* * * * *